United States Patent
Suzuki et al.

(10) Patent No.: US 11,048,448 B2
(45) Date of Patent: Jun. 29, 2021

(54) INFORMATION PROCESSING APPARATUS AND POWER ESTIMATION METHOD

(71) Applicant: FUJITSU LIMITED, Kawasaki (JP)

(72) Inventors: Shigeto Suzuki, Kawasaki (JP); Takuji Yamamoto, Hachiouji (JP); Michiko Shiraga, Kawasaki (JP); Takashi Shiraishi, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/751,231

(22) Filed: Jan. 24, 2020

(65) Prior Publication Data

US 2020/0272371 A1 Aug. 27, 2020

(30) Foreign Application Priority Data

Feb. 25, 2019 (JP) .............................. JP2019-031539

(51) Int. Cl.
*G06F 3/12* (2006.01)

(52) U.S. Cl.
CPC ............ *G06F 3/1205* (2013.01); *G06F 3/124* (2013.01); *G06F 3/126* (2013.01); *G06F 3/1212* (2013.01); *G06F 3/1286* (2013.01)

(58) Field of Classification Search
CPC ..................................................... G06F 3/1205
USPC ........................................................ 358/1.15
See application file for complete search history.

(56) References Cited

U.S. PATENT DOCUMENTS

| 2015/0067693 | A1 | 3/2015 | Yamazaki |
| 2017/0242728 | A1* | 8/2017 | Moroo ................. G06F 9/5094 |
| 2018/0144272 | A1* | 5/2018 | Moroo ................. G06F 9/505 |
| 2019/0164109 | A1 | 5/2019 | Suhara et al. |

FOREIGN PATENT DOCUMENTS

| JP | 09-022402 | 1/1997 |
| JP | 2011-108045 | 6/2011 |
| JP | 2014-217091 | 11/2014 |
| JP | 2015-049562 | 3/2015 |
| JP | 2015-090691 | 5/2015 |
| JP | 2016-071841 | 5/2016 |
| WO | 2017/131043 | 8/2017 |

* cited by examiner

*Primary Examiner* — Jacky X Zheng
(74) *Attorney, Agent, or Firm* — Fujitsu Patent Center

(57) ABSTRACT

A non-transitory computer-readable recording medium stores therein a program that causes a computer to execute a process, the process including: specifying first job information related to a new job; referring to a storage that stores second job information and power information for each of past jobs to specify a predetermined number of pieces of third job information of which matching status with the first job information satisfies a first condition; determining, for each piece of the third job information, whether a matching status with the first job information satisfies a second condition; specifying one piece of the third job information based on a determination result; specifying power information associated with the one piece of the third job information; correcting the specified power information in accordance with the determination result; and estimating power information indicating power consumption at a time of executing the new job based on the corrected power information.

20 Claims, 28 Drawing Sheets

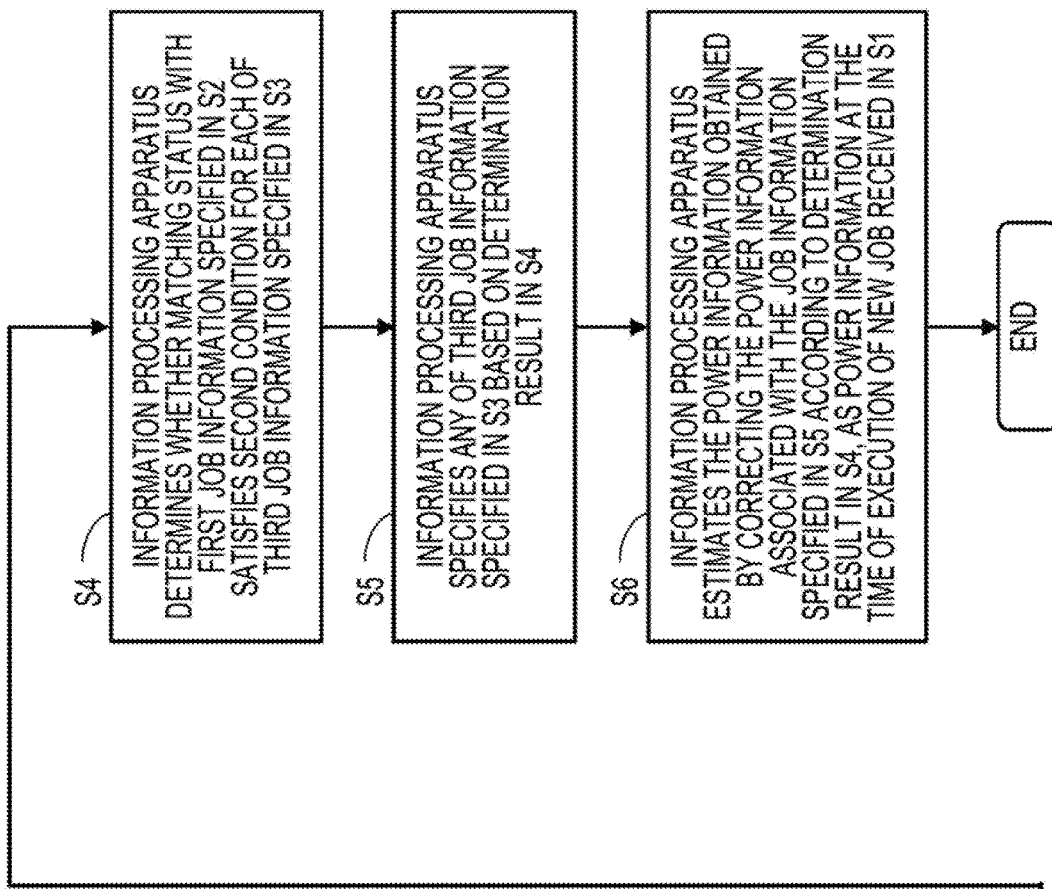
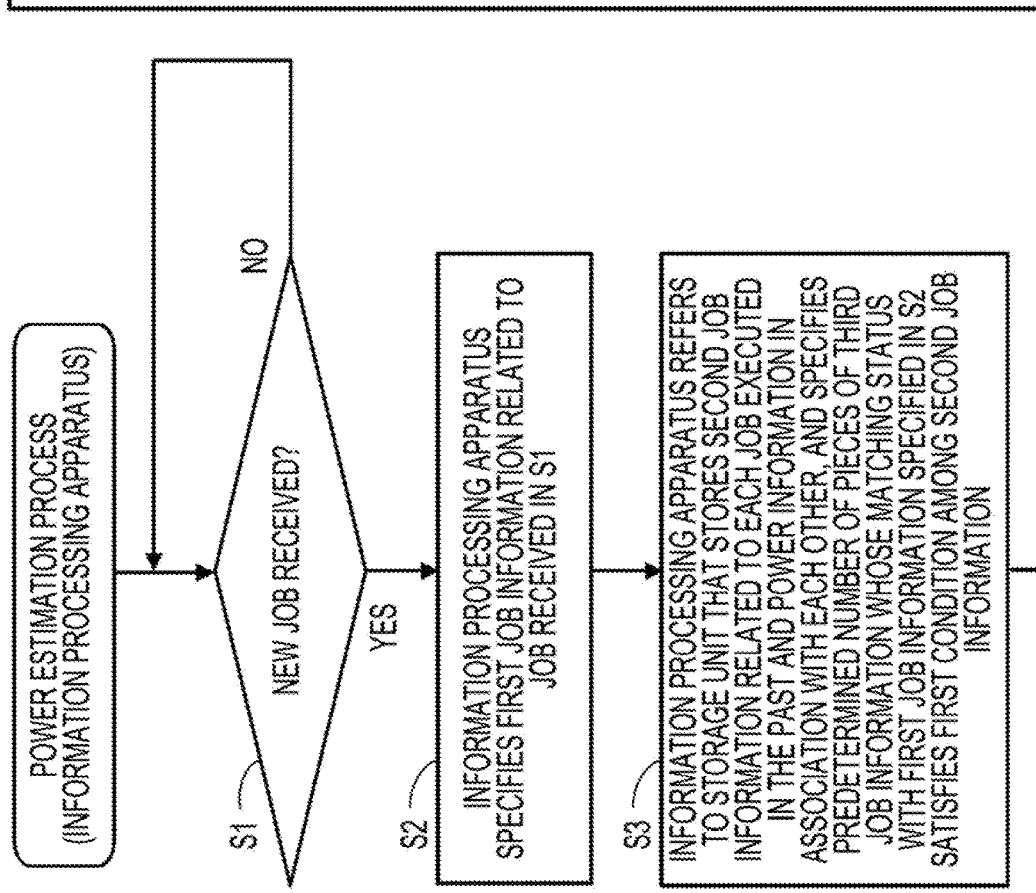
FIG. 4

FIG. 6
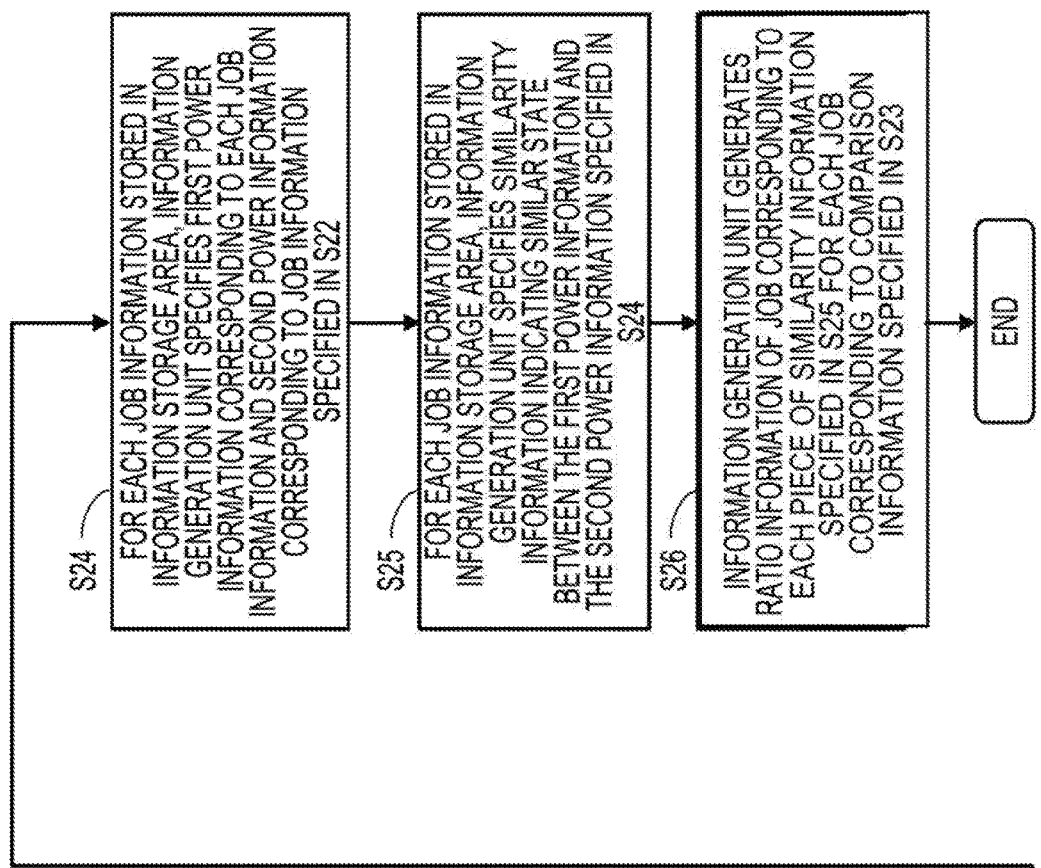
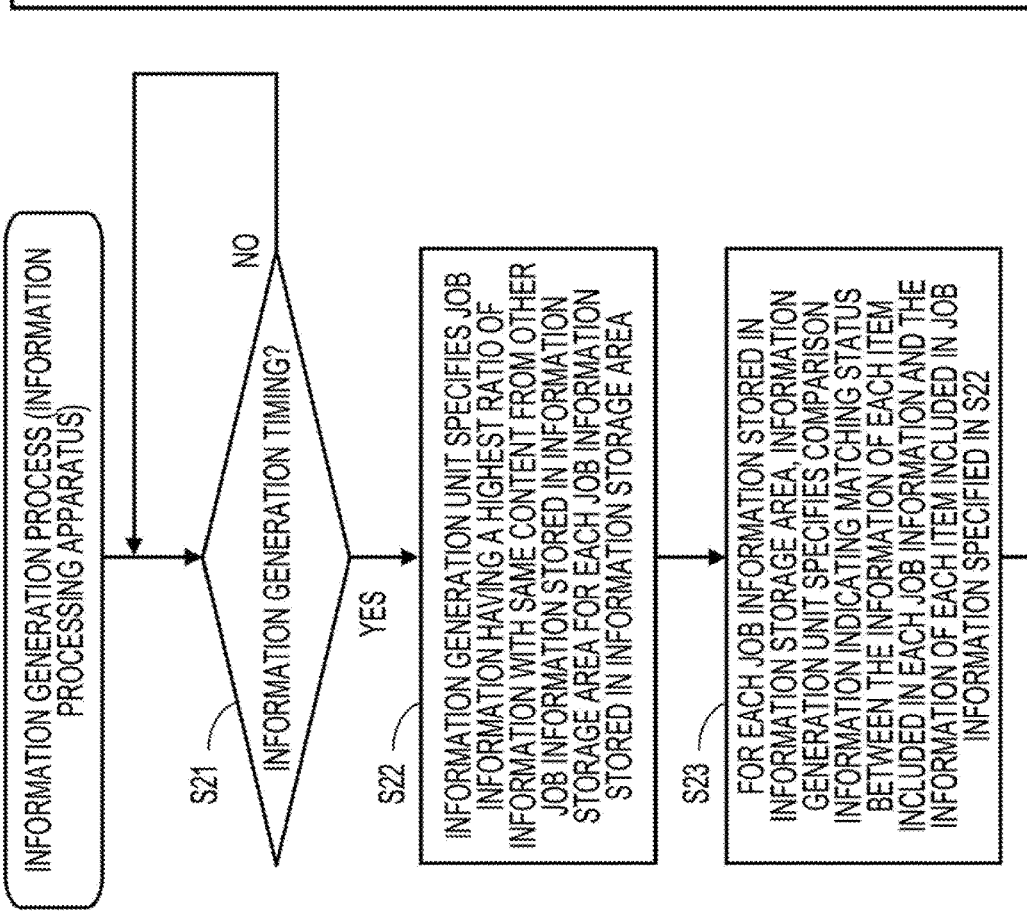

FIG. 7
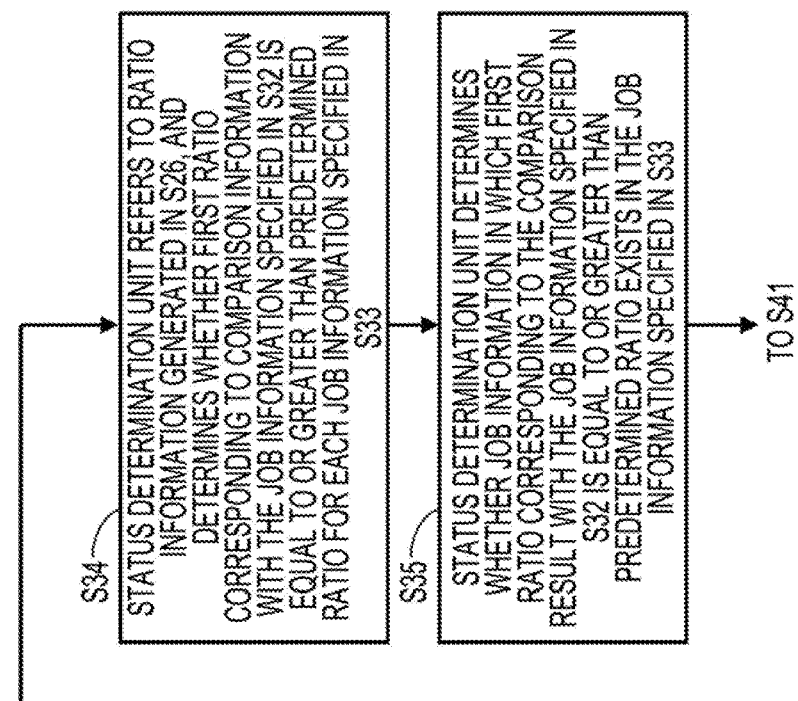
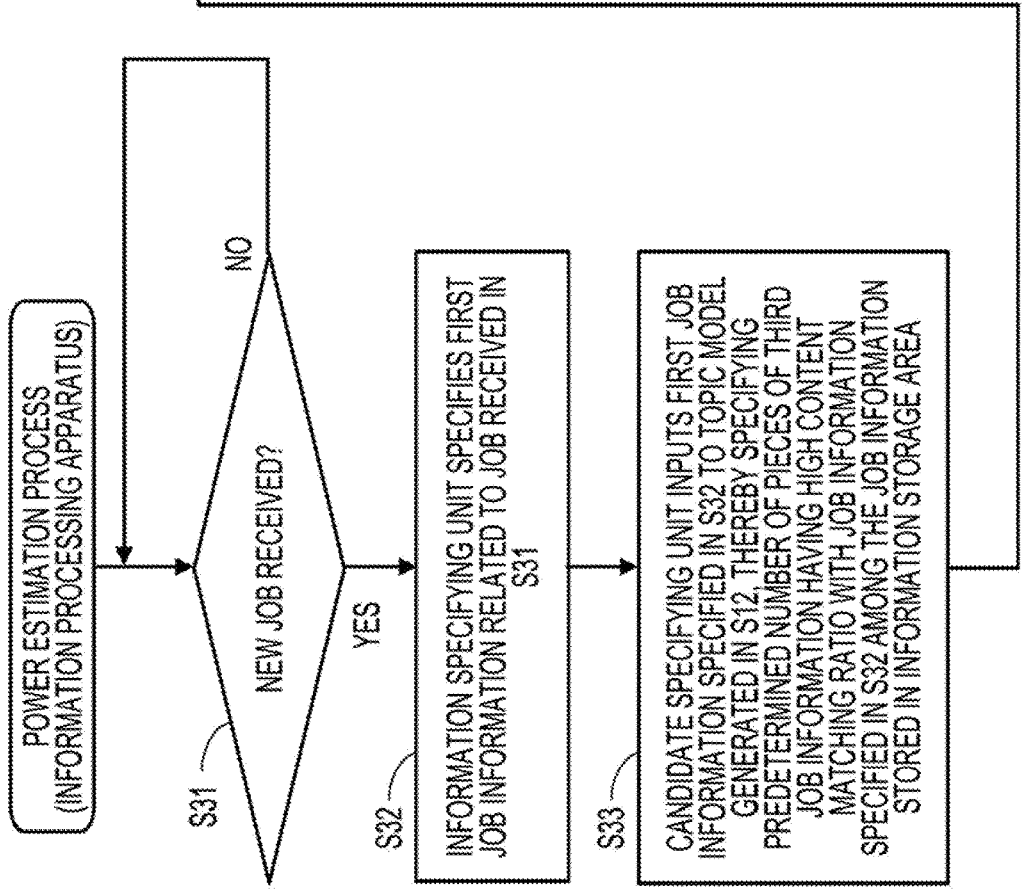

FIG. 12
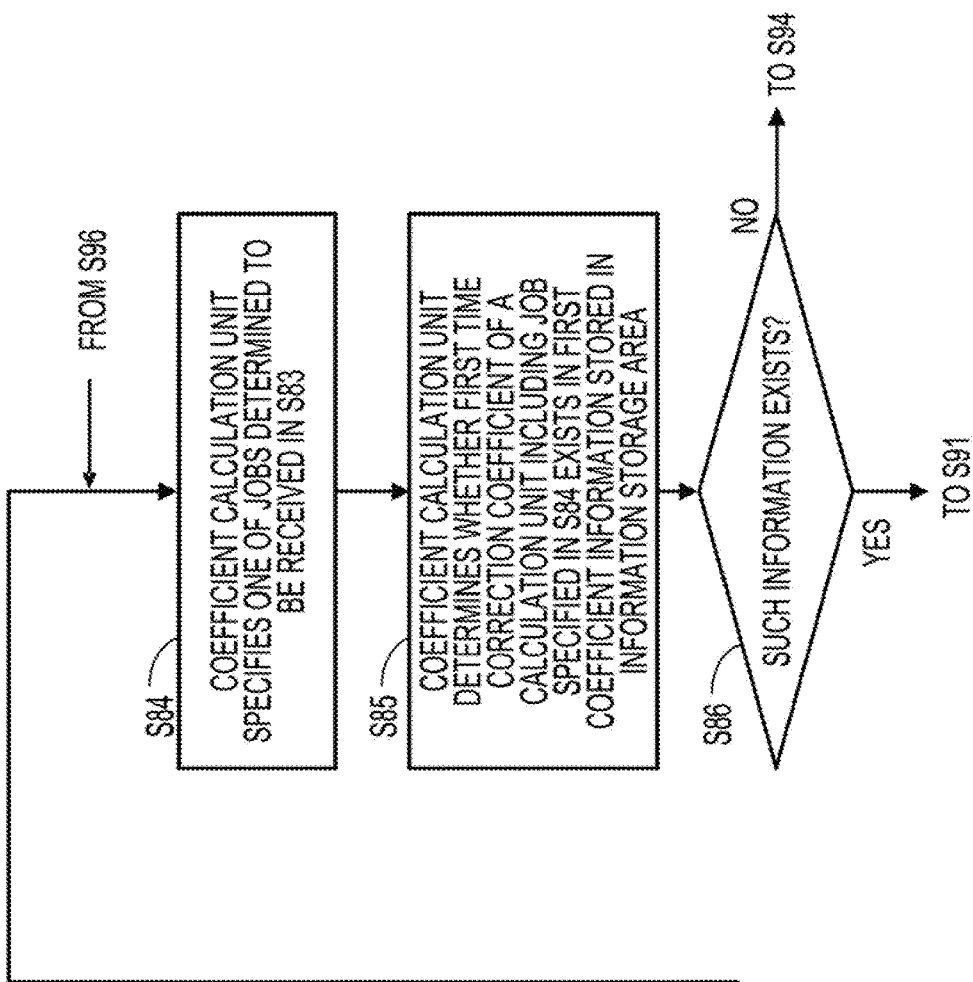
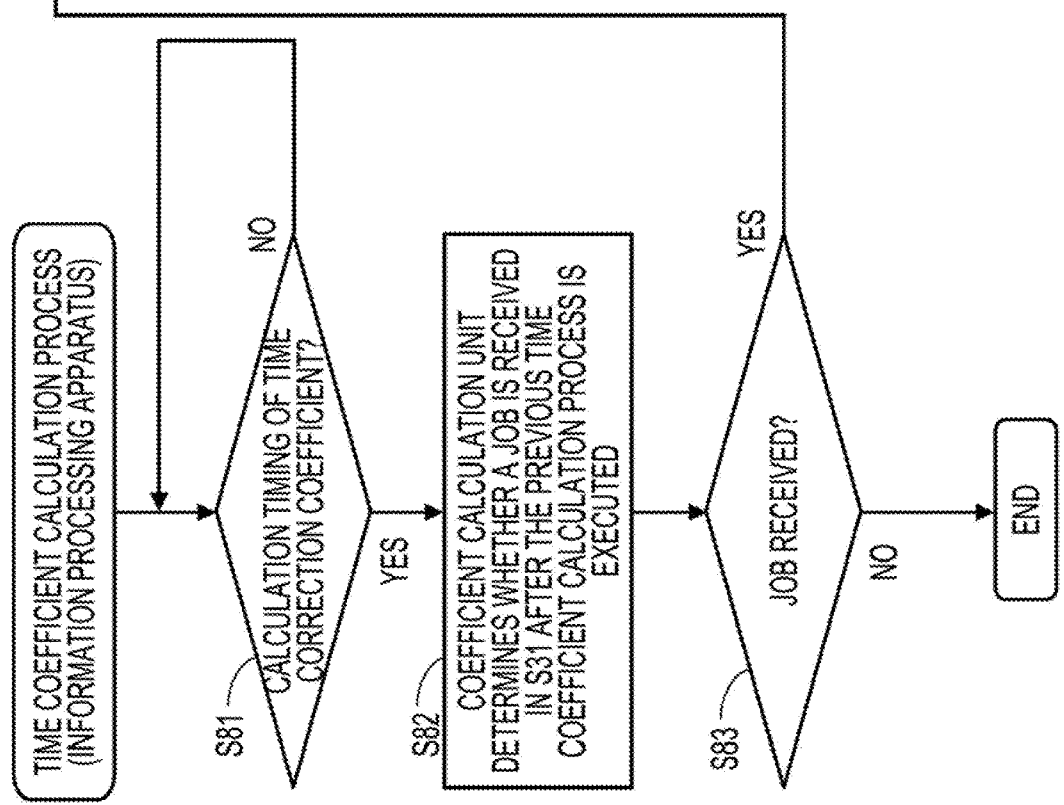

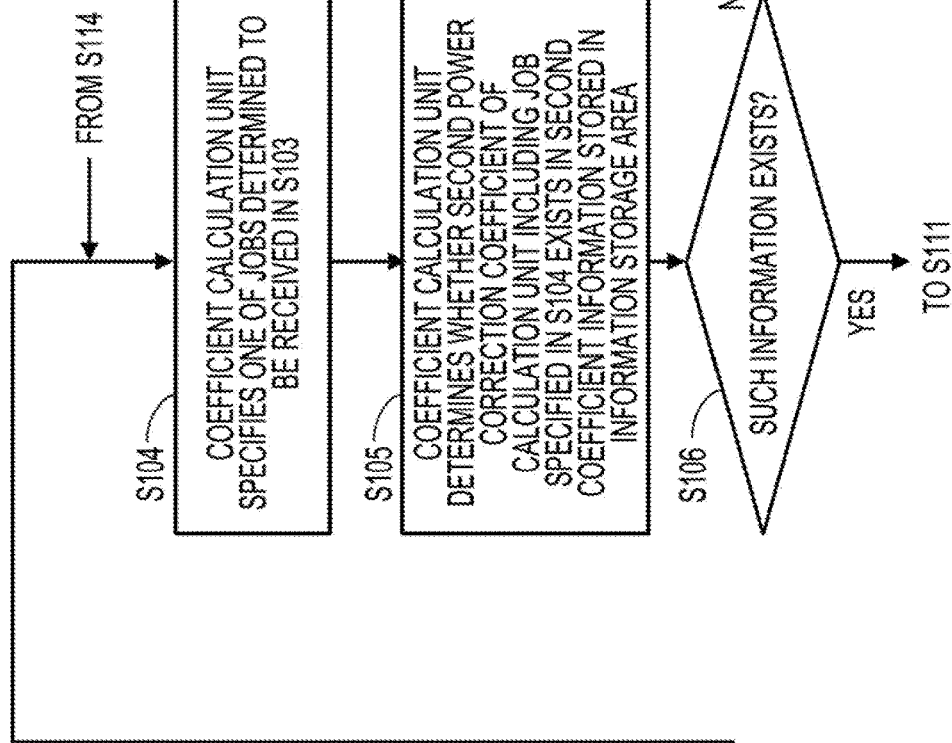
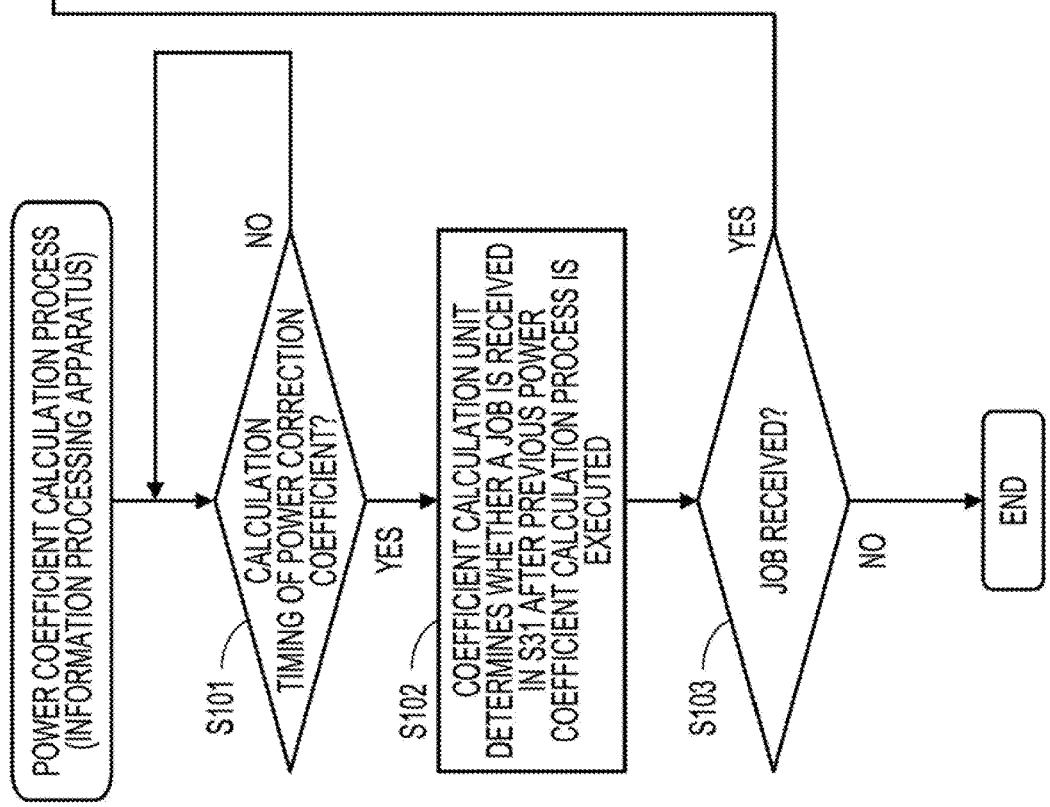
FIG. 14

FIG. 18
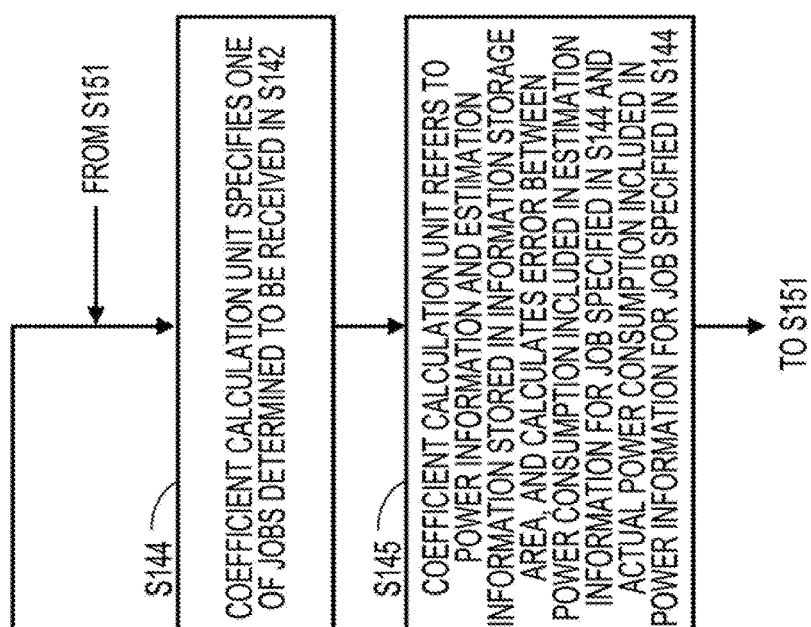
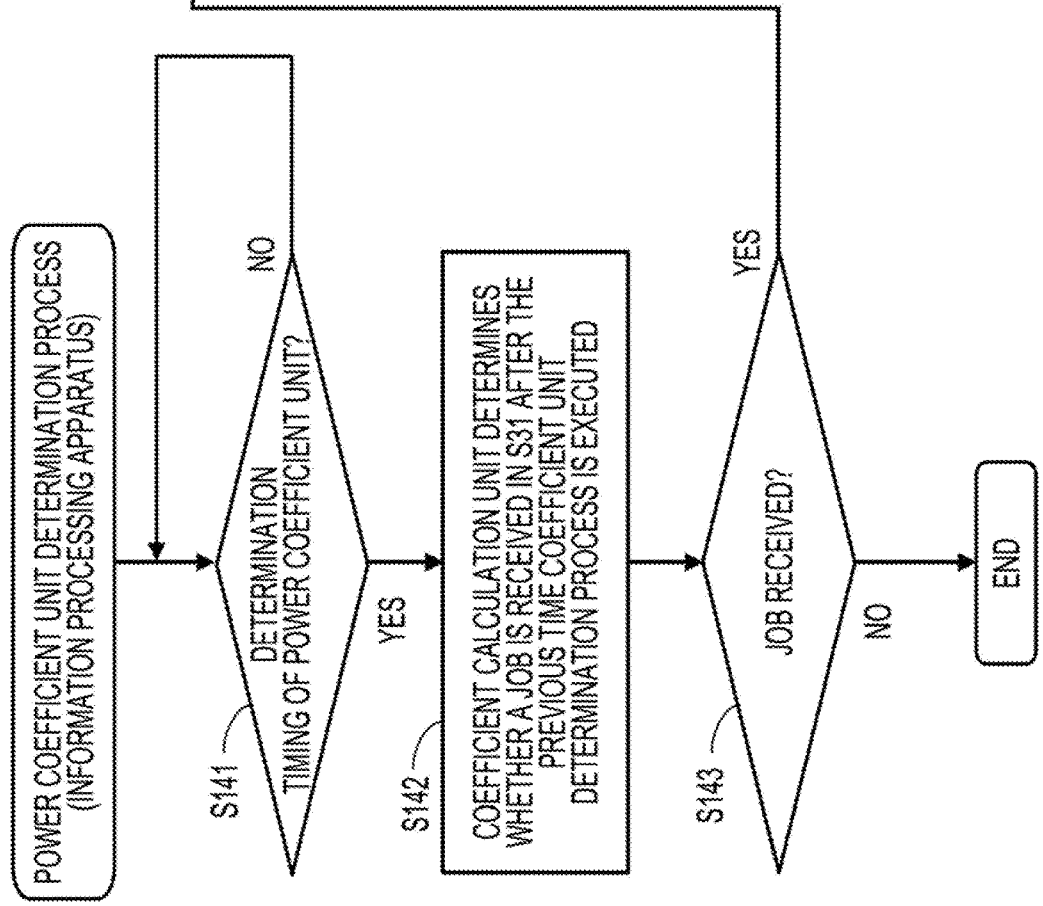

FIG. 20

SPECIFIC EXAMPLE OF JOB INFORMATION 131

| JOB ID | USER NAME | GROUP NAME | APPLICATION NAME | NUMBER OF REQUESTED NODES | MAXIMUM EXECUTION TIME (h) |
|---|---|---|---|---|---|
|  | tanaka | RD | app12 | 100 | 24 |

FIG. 21A

SPECIFIC EXAMPLE OF JOB INFORMATION 131 OF JOB RECEIVED IN S31

| JOB ID | USER NAME | GROUP NAME | APPLICATION NAME | NUMBER OF REQUESTED NODES | MAXIMUM EXECUTION TIME (h) |
|---|---|---|---|---|---|
| JOBA3 | tanaka | RD | app12 | 100 | 24 |

FIG. 21B

SPECIFIC EXAMPLE OF JOB INFORMATION 131 OF JOB EXECUTED IN THE PAST

| JOB ID | USER NAME | GROUP NAME | APPLICATION NAME | NUMBER OF REQUESTED NODES | MAXIMUM EXECUTION TIME (h) |
|---|---|---|---|---|---|
| JOBD2 | tanaka | RD | app15 | 80 | 15 |

FIG. 21C

SPECIFIC EXAMPLE OF COMPARISON INFORMATION

| JOB ID | USER NAME | GROUP NAME | APPLICATION NAME | NUMBER OF REQUESTED NODES | MAXIMUM EXECUTION TIME (h) |
|---|---|---|---|---|---|
| FALSE | TRUE | TRUE | FALSE | FALSE | FALSE |

FIG. 22

SPECIFIC EXAMPLE OF POWER INFORMATION 132

| JOB ID | 5 MINS(kw) | 10 MINS (kw) | 15 MINS (kw) | 20 MINS (kw) | ... |
|--------|------------|--------------|--------------|--------------|-----|
| JOBA3  | 300        | 360          | 200          | 250          | ... |

FIG. 24

SPECIFIC EXAMPLE OF RATIO INFORMATION 134

| ITEM NUMBER | JOB ID | USER NAME | GROUP NAME | APPLICATION NAME | NUMBER OF REQUESTED NODES | MAXIMUM EXECUTION TIME | SUCCESS (%) | FAILURE A (%) | FAILURE B (%) | FAILURE C (%) |
|---|---|---|---|---|---|---|---|---|---|---|
| 1 | TRUE | TRUE | TRUE | TRUE | TRUE | TRUE | 80 | 10 | 10 | 0 |
| 2 | FALSE | TRUE | TRUE | TRUE | TRUE | TRUE | 60 | 15 | 10 | 5 |
| 3 | TRUE | FALSE | TRUE | TRUE | TRUE | TRUE | 90 | 0 | 10 | 0 |
| 4 | TRUE | TRUE | FALSE | TRUE | TRUE | TRUE | 75 | 10 | 5 | 10 |
| ... | ... | ... | ... | ... | ... | ... | ... | ... | ... | ... |

FIG. 25

SPECIFIC EXAMPLE OF FIRST COEFFICIENT INFORMATION 135a

| ITEM NUMBER | GROUP NAME | USER NAME | APPLICATION NAME | CORRECTION COEFFICIENT |
|---|---|---|---|---|
| 1 | RD | tanaka | app12 | 0.6 |
| 2 | test | - | - | 0.9 |
| ... | ... | ... | ... | ... |

FIG. 26

SPECIFIC EXAMPLE OF SECOND COEFFICIENT INFORMATION 135b

| ITEM NUMBER | GROUP NAME | USER NAME | APPLICATION NAME | CORRECTION COEFFICIENT EXPRESSION | NUMBER OF JOBS |
|---|---|---|---|---|---|
| 1 | RD | tanaka | app12 | 1 - 3 | 10 |
| 2 | test | suzuki | - | 4 - 3 | 5 |
| ... | ... | ... | ... | ... | ... |

FIG. 27

SPECIFIC EXAMPLE OF FIRST COEFFICIENT INFORMATION 135a

| ITEM NUMBER | GROUP NAME | USER NAME | APPLICATION NAME | CORRECTION COEFFICIENT |
|---|---|---|---|---|
| 1 | RD | tanaka | app12 | 0.6 |
| 2 | test | suzuki | - | - |
| ... | ... | ... | ... | ... |

FIG. 28

SPECIFIC EXAMPLE OF SECOND COEFFICIENT INFORMATION 135b

| ITEM NUMBER | GROUP NAME | USER NAME | APPLICATION NAME | CORRECTION COEFFICIENT EXPRESSION | NUMBER OF JOBS |
|---|---|---|---|---|---|
| 1 | RD | tanaka | app12 | 1-3 | 10 |
| 2 | test | suzuki | app03 | - | 2 |
| ... | ... | ... | ... | ... | ... | ion processing apparatus and a power estimation method.

INFORMATION PROCESSING APPARATUS AND POWER ESTIMATION METHOD

CROSS-REFERENCE TO RELATED APPLICATION

This application is based upon and claims the benefit of the prior Japanese Patent Application No. 2019-031539 filed on Feb. 25, 2019, the entire contents of which are incorporated herein by reference.

FIELD

The embodiments discussed herein are related to an information processing apparatus and a power estimation method.

BACKGROUND

A business operator that operates a large-scale computing system that consumes a large amount of power may make a contract for power use with a power company as necessary. Specifically, for example, the business operator makes a contract in which the power rate for the next predetermined period (e.g., the next one year) is determined depending on whether the amount of power consumed within a unit time (e.g., 30 minutes) included in the predetermined period (e.g., one year) exceeds the contracted power amount.

Therefore, in this case, the business operator schedules an execution timing of each job (e.g., work) so that the power consumption amount per unit time does not exceed the contracted power amount.

Here, when scheduling the execution timing of a job as described above, the business operator specifies job information similar to job information, which is various information related to a job to be executed, among, for example, job information related to jobs executed in the past. Then, the business operator estimates information including power consumption at the time of execution of the job corresponding to the specified job information (hereinafter, also referred to as power information) as power information corresponding to the job to be executed. Thus, the business operator may perform an execution timing scheduling, for the job to be executed.

However, the power information corresponding to the job to be executed may not be similar to the power information of other jobs having similar job information. For this reason, the business operator may not be able to accurately estimate power information at the time of job execution.

Related technologies are disclosed in, for example, Japanese Laid-Open Patent Publication No. 2014-217091, Japanese Laid-Open Patent Publication No. 2011-108045, Japanese Laid-Open Patent Publication No. 2015-049562, Japanese Laid-Open Patent Publication No. 2016-071841, Japanese Laid-Open Patent Publication No. 2015-090691, and Japanese Laid-Open Patent Publication No. 09-022402 and International Publication Pamphlet. No. 2017/131043.

SUMMARY

According to an aspect of the embodiments, a non-transitory computer-readable recording medium stores therein a program that causes a computer to execute a process, the process including: specifying, upon receiving a new job, first job information related to the new job; referring to a storage that stores second job information and power information in association with each other for each of past jobs executed in past to specify a predetermined number of pieces of third job information of which matching status with the first job information satisfies a first condition, the second job information being related to each of the past jobs, the power information indicating power consumption at a time of executing each of the past jobs; determining, for each piece of the third job information, whether a matching status with the first job information satisfies a second condition; specifying one piece of the third job information based on a determination result as to whether the matching status satisfies the second condition; referring to the storage to specify power information associated with the one piece of the third job information; correcting the specified power information in accordance with the determination result; and estimating power information indicating power consumption at a time of executing the new job based on the corrected power information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a flowchart for explaining an outline of a power estimation process according to a first embodiment;

FIG. 6 is a flowchart for explaining details of the power estimation process according to the first embodiment;

FIG. 7 is a flowchart for explaining details of the power estimation process according to the first embodiment;

FIG. 12 is a flowchart for explaining details of the power estimation process according to the first embodiment;

FIG. 14 is a flowchart for explaining details of the power estimation process according to the first embodiment;

FIG. 18 is a flowchart for explaining details of the power estimation process according to the first embodiment;

FIG. 20 is a diagram for describing a specific example of job information 131;

FIGS. 21A to 21C are diagrams for explaining specific examples of the process of S23;

FIG. 22 is a diagram for explaining a specific example of power information 132;

FIG. 24 is a diagram for explaining a specific example of ratio information 134;

FIG. 25 is a diagram illustrating a specific example of first coefficient information 135a;

FIG. 26 is a diagram illustrating a specific example of second coefficient information 135b;

FIG. 27 is a diagram illustrating a specific example of the first coefficient information 135a; and FIG. 28 is a diagram illustrating a specific example of the second coefficient information 135b.

DESCRIPTION OF EMBODIMENTS

[Configuration of Information Processing Apparatus]

Figure 1:
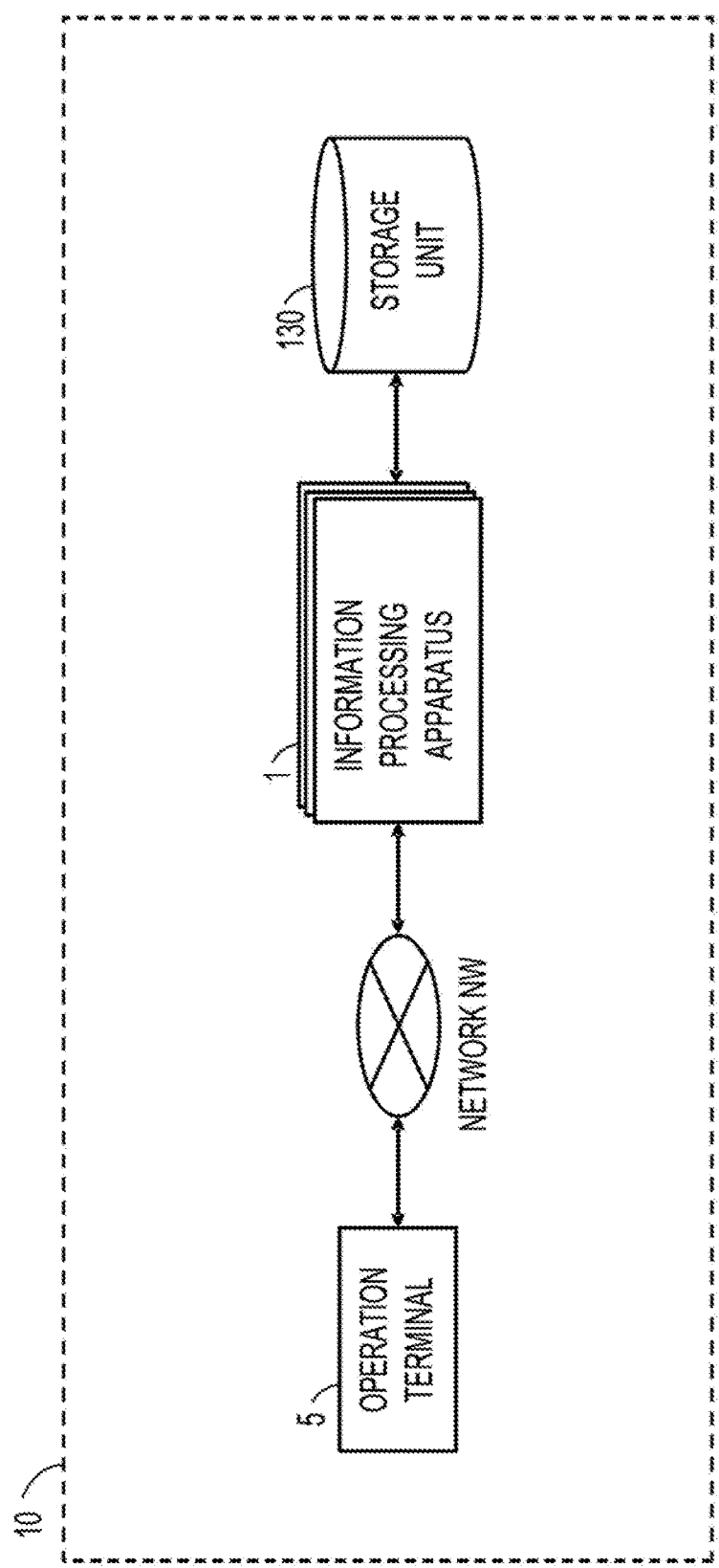
FIG. 1 is a diagram illustrating a configuration of an information processing system 10.

The configuration of an information processing system 10 will be described first. FIG. 1 is a diagram illustrating the configuration of the information processing system 10.

As illustrated in FIG. 1, the information processing system 10 includes, for example, an information processing apparatus 1 including one or more physical machines, and an operation terminal 5 on which a person in charge (e.g., an operator) inputs information or the like.

The information processing apparatus 1 estimates power information at the time of execution of each job that needs to be scheduled for execution timing. Then, the information processing apparatus 1 schedules the execution timing of each job based on the estimated power information.

Specifically, the information processing apparatus 1 specifies, for example, job information related to each job (hereinafter, also referred to as a new job) that needs to be scheduled for execution timing (hereinafter, also referred to as first job information). Then, the information processing apparatus 1 refers to a storage unit 130 that stores job information related to each job executed in the past (hereinafter, also referred to as second job information) and power information at the time of execution of each job in association with each other, and specifies a predetermined number of pieces of job information of which a matching status with the first job information satisfies a predetermined condition (hereinafter, also referred to as a first condition) among the second job information (hereinafter, also referred to as third job information). Further, the information processing apparatus 1 determines whether the matching status with the first job information satisfies a predetermined condition (hereinafter, also referred to as a second condition) for each specified third job information, and specifies any of the third job information based on the determination result.

Thereafter, the information processing apparatus 1 refers to the storage unit 130 and specifies power information associated with the specified job information. Then, the information processing apparatus 1 estimates power information obtained by correcting the specified power information according to the determination result, as power information at the time of execution of a new job.

That is, the information processing apparatus 1 specifies a predetermined number of pieces of third job information similar to the first job information corresponding to a new job to be executed among, for example, the second job information corresponding to each job executed in the past. Then, the information processing apparatus 1 specifies power information of a job corresponding to job information that is most similar to the first job information (hereinafter, also referred to as similar job information) among, for example, the specified third job information. Further, the information processing apparatus 1 specifies power information obtained by correcting, for example, the specified power information according to a similar state between the first job information and the similar job information, as power information of a new job.

As a result, the information processing apparatus 1 may accurately estimate power information when a new job is executed. For this reason, the information processing apparatus 1 may suppress an increase in power charge associated with the execution of each job.

[Hardware Configuration of Information Processing System]

Figure 2:
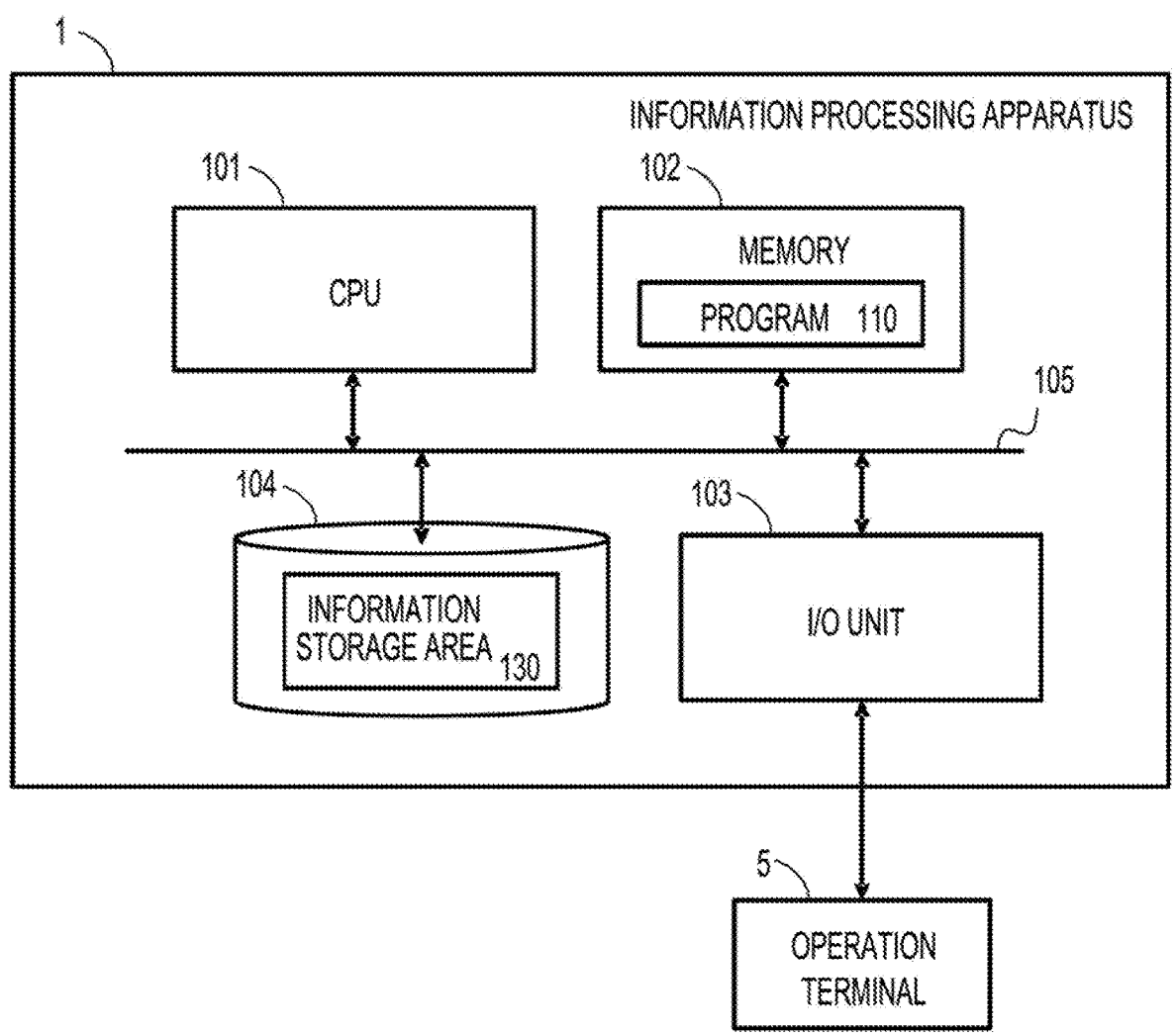
FIG. 2 is a diagram illustrating a hardware configuration of an information processing apparatus 1.

Next, the hardware configuration of the information processing system 10 will be described. FIG. 2 is a diagram illustrating the hardware configuration of the information processing apparatus 1.

As illustrated in FIG. 2, the information processing apparatus 1 includes a CPU 101 that is a processor, a memory 102, an external interface (I/O unit) 103, and a storage medium 104. Respective units are connected to each other via a bus 105.

The storage medium 104 includes, for example, a program storage area (not illustrated) that stores a program 110 for performing a process of estimating power information when each job is executed (hereinafter, also referred to as a power estimation process). In addition, the storage medium 104 includes, for example, a storage unit 130 that stores information used when performing a power estimation process (hereinafter, also referred to as an information storage area 130). Further, the storage medium 104 may be, for example, a hard disk drive (HDD) or a solid state drive (SSD).

The CPU 101 executes a program 110 loaded from the storage medium 104 to the memory 102 to perform the power estimation process.

Further, the external interface 103 communicates with, for example, the operation terminal 5.

[Function of Information Processing System]

Figure 3:
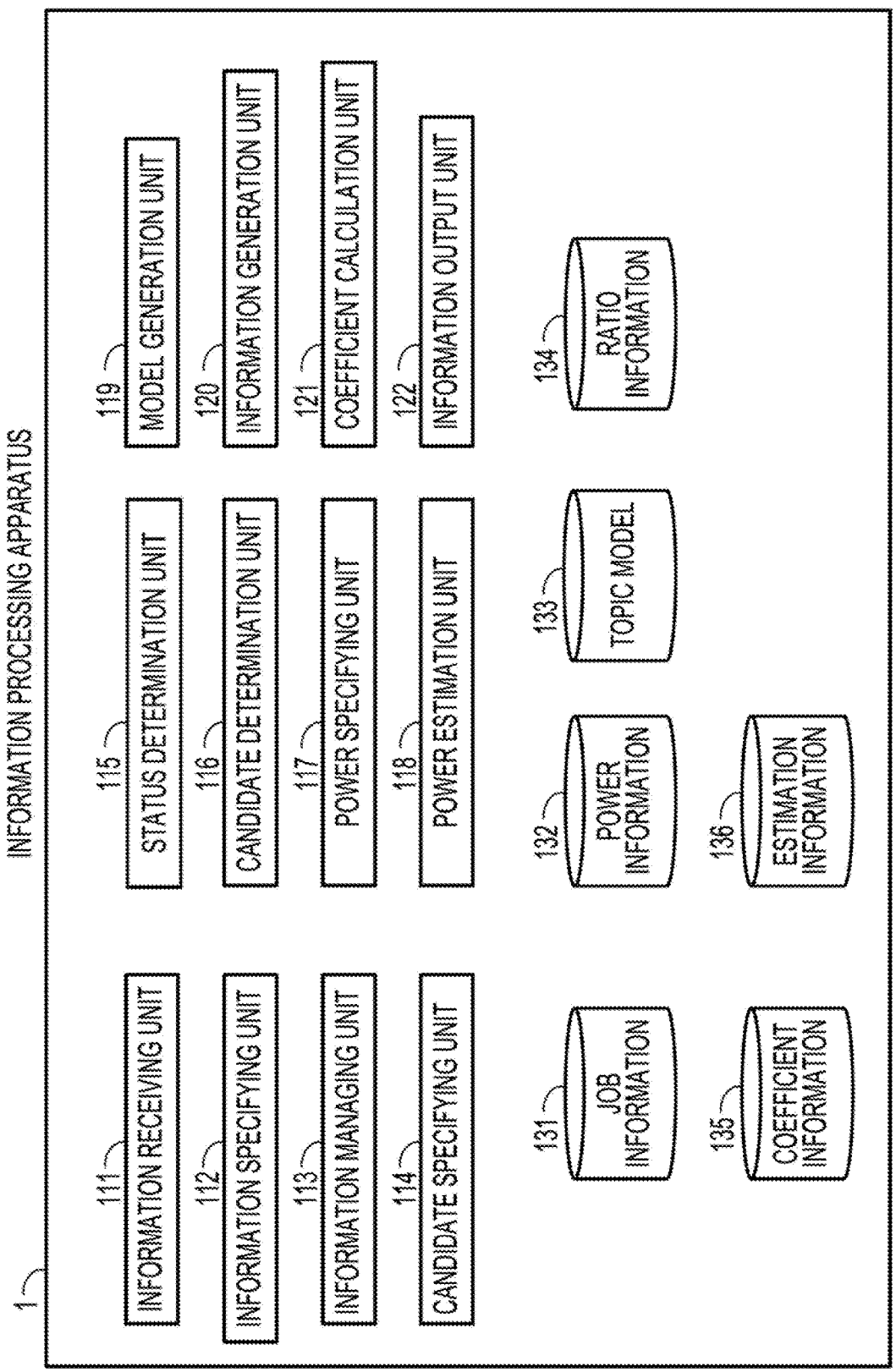
FIG. 3 is a functional block diagram of the information processing apparatus 1.

Next, the function of the information processing system 10 will be described. FIG. 3 is a functional block diagram of the information processing apparatus 1.

As illustrated in FIG. 3, the hardware such as, for example, the CPU 101 and the memory 102 organically cooperates with the program 110, whereby the information processing apparatus 1 implements various functions including the functions of an information receiving unit 111, an information specifying unit 112, an information managing unit 113, a candidate specifying unit 114, a status determination unit 115, a candidate determination unit 116, a power specifying unit 117, a power estimation unit 118, a model generation unit 119, an information generation unit 120, a coefficient calculation unit 121, and an information output unit 122.

Further, for example, as illustrated in FIG. 3, the information processing apparatus 1 stores job information 131, power information 132, a topic model 133, ratio information 134, coefficient information 135, and estimation information 136 in the information storage area 130. Hereinafter, the job information 131 is also referred to as first job information 131a, second job information 131b, or third job information 13k as necessary.

The information receiving unit 111 receives, for example, a new job that needs to be scheduled for execution timing.

The information specifying unit 112 specifies the first job information 131a related to the new job received by the information receiving unit 111. The job information 131 is, for example, information including job identification information (hereinafter, also referred to as a job ID) and a name of a user who executes the job (hereinafter, also referred to as a user name).

The information managing unit 113 stores, for example, the job information 131 specified by the information specifying unit 112 in the information storage area 130.

The candidate specifying unit 114 uses, for example, the topic model 133 generated by learning a correspondence between the second job information 131b regarding each job executed in the past and the power information 132 required for executing each job, thereby specifying a predetermined number of pieces of third job information 131c of which the matching status with the first job information 131a satisfies the first condition among the second job information 131b. Specifically, the candidate specifying unit 114 specifies a predetermined number of pieces of job information 131 having a high ratio of information that matches the content of the first job information 131a among, for example, the second job information 131b, as a predetermined number of pieces of third job information 131c that satisfies the first condition.

The status determination unit 115 determines whether the matching status with the first job information 131a satisfies the second condition for each third job information 131c specified by the candidate specifying unit 114. Specifically, the status determination unit 115 specifies the job information 131 having a highest ratio of information that matches the content of the first job information 131a among, for example, the third job information 131c, as the third job information 131c that satisfies the second condition.

The candidate determination unit 116 specifies any one of the third job information 131c based on the determination result by the status determination unit 115. Specifically, the candidate determination unit 116 specifies the job information 131 having a highest ratio of information that matches the content of the first job information 131a among, for example, the third job information 131c.

The power specifying unit 117 specifies the power information 132 associated with the third job information 131c specified by the candidate determination unit 116 from the power information 132 stored in the information storage area 130. The power information 132 is information indicating, for example, the transition of power consumption during execution of each job.

The power estimation unit 118 estimates the power information 132 obtained by correcting the power information 132 specified by the power specifying unit 117 according to the determination result by the status determination unit 115, as the power information 132 at the time of execution of a new job received by the information receiving unit 111.

The model generation unit 119 generates the topic model 133 by inputting the job information 131 stored in the information storage area 130.

The information generation unit 120 generates ratio information 134 from the job information 131 stored in the information storage area 130. The ratio information 134 is, for example, information indicating a matching status between the estimation information 136 that is an estimation result of the power information 132 of each job estimated by using the topic model 133 and the actual power information 132 of each job.

The coefficient calculation unit 121 generates coefficient information 135 including various correction coefficients used by the power estimation unit 118.

The information output unit 122 outputs the power information 132 estimated by the power estimation unit 118. Specifically, the information output unit 122 outputs the power information 132 to, for example, the operation terminal 5.

[Outline of First Embodiment]

Next, an outline of a first embodiment will be described. FIG. 4 is a flowchart for explaining an outline of a power estimation process according to the first embodiment.

As illustrated in FIG. 4, the information processing apparatus 1 stands by until a new job has been received ("NO" in S1). Specifically, the information processing apparatus 1 stands by until a new job that needs to be scheduled for execution timing has been received.

In addition, when a new job has been received ("YES" in S1), the information processing apparatus 1 specifies the first job information 131a related to the new job received in S1 (S2).

Subsequently, the information processing apparatus 1 refers to the information storage area 130 that stores the second job information 131b related to each job executed in the past and the power information 132 required for executing each job in association with each other, and specifies a predetermined number of pieces of third job information 131c of which the matching status with the first job information 131a satisfies the first condition among the second job information 131b (S3).

Next, the information processing apparatus 1 determines whether the matching status with the first job information 131a satisfies the second condition for each of the third job information 131c specified in the process of S3 (S4).

Then, the information processing apparatus 1 specifies any job information 131 among the third job information 131c based on the determination result in S4 (S5).

Thereafter, the information processing apparatus 1 estimates the power information 132 obtained by correcting the power information 132 associated with the job information 131 specified in S5 according to the determination result in S4, as the power information 132 at the time of execution of the new job received in S1 (S6).

As a result, the information processing apparatus 1 may accurately estimate power information when a new job is executed. For this reason, the information processing apparatus 1 may suppress an increase in power charge associated with the execution of each job.

[Details of First Embodiment]

Next, details of the first embodiment will be described. FIGS. 5 to 19 are flowcharts for explaining details of the power estimation process according to the first embodiment. Further FIGS. 20 to 28 are diagrams for explaining the details of the power estimation process according to the first embodiment.

[Model Generation Process]

Figure 5:
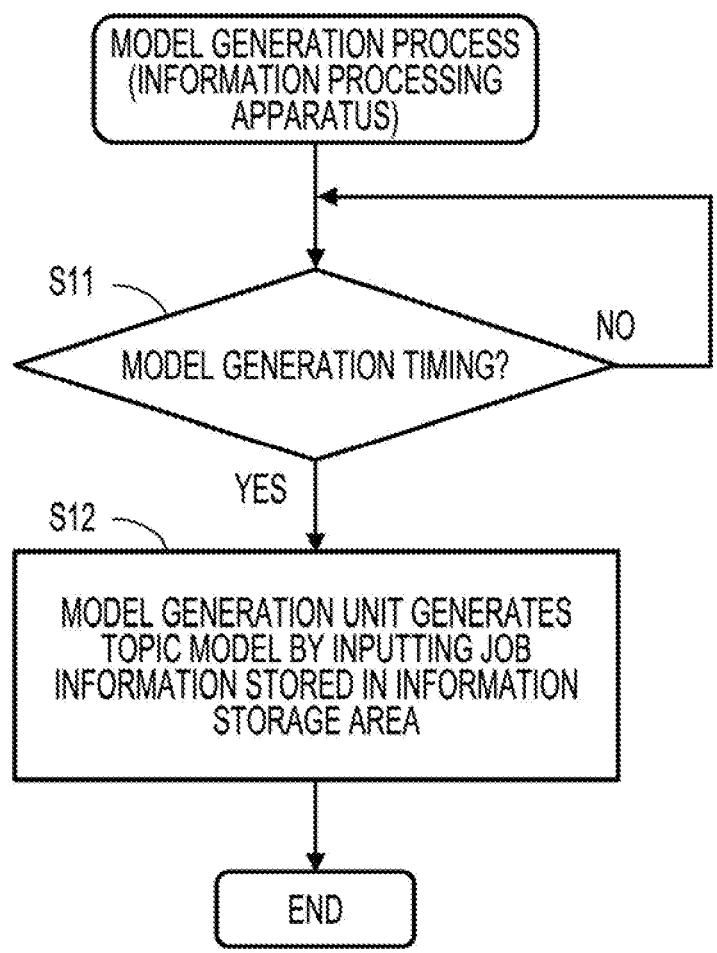
FIG. 5 is a flowchart for explaining details of the power estimation process according to the first embodiment.

First, a process of generating the topic model 133 (hereinafter, model generation process) will be described. FIG. 5 is a flowchart for explaining the model generation process.

As illustrated in FIG. 5, the model generation unit 119 of the information processing apparatus 1 stands by until the model generation timing is reached ("NO" in S11). The model generation timing may be, for example, a timing when the person in charge inputs information indicating that the topic model 133 is generated to the information processing apparatus 1.

When the model generation timing is reached ("YES" in S11), the model generation unit 119 generates the topic model 133 by inputting the job information 131 stored in the information storage area 130 (S12).

Specifically, in response to the input of the first job information 131a related to the new job, the model generation unit 119 executes generation of the topic model 133 that outputs the job information 131 having a highest ratio of information that matches the content of the first job information 131a among the second job information 131b related to the job executed in the past. Hereinafter, a specific example of the job information 131 will be described.

[Specific Example of Job Information]

FIG. 20 is a diagram for explaining a specific example of the job information 131.

The job information 131 illustrated in FIG. 20 includes a "job ID" in which a job ID that is identification information of each job is stored, a "user name" in which a user name that is a name of a user who executes each job is stored, and a "group name" in which the group name to which each user belongs is stored as items. Further, the job information 131 illustrated in FIG. 20 includes an "application name" that is the name of an application that is called when each job is executed, a "100" that is the number of execution nodes required when each job is executed, and a "maximum execution time" which is the maximum time allowed as the execution time of each job as items.

Specifically, with respect to the job information 131 illustrated in FIG. 20, "tanaka" is stored as the "user name," "RD" is stored as the "group name," and "app12" is stored as the "application name" in the information whose "job information ID" is "JOBA3." Further, with respect to the job information 131 illustrated in FIG. 20, "100 (units)" is stored as the "number of requested nodes" and "24 (h)" is stored as the "maximum execution time" in the information whose "job information ID" is "JOBA3."

[Information Generation Process]

Next, a process of generating the ratio information 134 (hereinafter, information generation process) will be described. FIG. 6 is a flowchart for explaining the information generation process.

As illustrated in FIG. 6, the information generation unit 120 of the information processing apparatus 1 stands by until the information generation timing is reached ("NO" in S21). The information generation timing may be, for example, a timing when the person in charge inputs information indicating that the ratio information 134 is generated to the information processing apparatus 1. Further, the information generation timing may be, for example, a periodic timing.

When the information generation timing is reached ("YES" in S21), the information generation unit 120 specifies the job information 131 having a highest ratio of information with the same content among other job information 131 stored in the information storage area 130 (hereinafter, also referred to as fourth job information 131) for each job information 131 stored in the information storage area 130 (S22).

Specifically, the information generation unit 120 specifies the other job information 131 having the highest ratio of information that matches the content of each job information 131 by inputting each job information 131 to, for example, the topic model 133 generated in the process of S12.

Subsequently, for each job information 131 stored in the information storage area 130, the information generation unit 120 specifies comparison information indicating a matching status between the information of each item included in each job information 131 and the information of each item included in the job information 131 specified in the process of S22 (S23). Hereinafter, the process of S23 will be described.

[Specific Example of Process of S23]

FIGS. 21A to 21C are diagrams illustrating specific examples of the process of S23. FIG. 21A is a diagram for explaining one of the job information 131 stored in the information storage area 130. In addition, FIG. 21B is a diagram for explaining job information 131 to be compared with the job information 131 illustrated in FIG. 21A among the job information 131 specified in the process of S22. Further, FIG. 21C is a specific example of comparison information between the job information 131 illustrated in FIG. 21A and the job information 131 illustrated in FIG. 21B.

Specifically, with respect to the job information 131 illustrated in FIG. 21A, "JOBA3" is stored as the "job ID," "tanaka" is stored as the "user name," "RD" is stored as the "group name," and "app12" is stored as the "application name." Further, with respect to the job information 131 illustrated in FIG. 21A, "100 (units)" is stored as the "number of requested nodes" and "24 (h)" is stored as the "maximum execution time."

Meanwhile, with respect to the job information 131 illustrated in FIG. 21B, "JOBD2" is stored as the "job ID," "tanaka" is stored as the "user name," "RD" is stored as the "group name," and "app15" is stored as the "application name." Further, with respect to the job information 131 illustrated in FIG. 21B, "80 (units)" is stored as the "number of requested nodes" and "15 (h)" is stored as the "maximum execution time."

That is, among the items included in the job information 131 illustrated in FIG. 21A, items whose contents match the job information 131 illustrated in FIG. 21B are the "user name" and the "group name," and the items whose contents do not match are the "job ID," the "application name," the "number of requested nodes," and the "maximum execution time." Therefore, in the process of S23, for example, as illustrated in FIG. 21C, the information generation unit 120 generates comparison information in which information corresponding to the "user name" and the "group name" is "TRUE," and information corresponding to the "job ID," the "application name," the "number of requested nodes," and the "maximum execution time" is "FALSE."

Referring back to FIG. 6, the information generation unit 120, for each job information 131 stored in the information storage area 130, specifies power information 132 corresponding to each job information 131 (hereinafter, also referred to as first power information 132) and power information 132 corresponding to the job information 131 specified in the process of S22 (hereinafter, also referred to as second power information 132) (S24). Hereinafter, a specific example of the power information 132 will be described.

[Specific Example of Power Information]

FIG. 22 is a diagram illustrating a specific example of the power information 132.

The power information 132 illustrated in FIG. 22 includes a "job ID" in which a job ID that is identification information of each job is stored, and "5 minutes," "10 minutes," "15 minutes," etc. in which average power consumption per node is stored for each unit time (e.g., 5 minutes) included in the execution time of each job, as items.

Specifically, with respect to the power information 132 illustrated in FIG. 22, "300 (kw)" is stored as "5 minutes," "360 (kw)" is stored as "10 minutes," and "200 (kw)" is stored as "15 minutes" in the information whose "JOB ID" is "JOBA3." Descriptions of other information included in FIG. 22 are omitted.

Referring back to FIG. 6, for each job information 131 stored in the information storage area 130, the information generation unit 120 specifies similarity information indicating a similar state between the first power information 132 and the second power information 132 specified in the process of S24 (S25).

That is, the information generation unit 120 determines whether the first power information 132 and the second power information 132 are similar, thereby determining whether the estimation result of the power information 132 performed by the topic model 133 generated in the process of S12 is appropriate. Hereinafter, a specific example of the process of S25 will be described.

[Specific Example of Process of S25]

FIGS. 23A to 23D are diagrams illustrating a specific example of the process of S25. Specifically, FIGS. 23A to 23D represent a specific example of the graph in a case where each information included in the first power information 132 and the second power information 132 is plotted on a plane in which the horizontal axis is time and the vertical axis is power consumption per node. Further, in the example illustrated in FIG. 23, the solid line indicates the content corresponding to the first power information 132, and the broken line indicates the content corresponding to the second power information 132.

In the process of S25, the information generation unit 120 calculates, for example, a mean square error between each power consumption included in the first power information 132 and each power consumption included in the second power information 132 (hereinafter, also referred to as a power error). Further, the information generation unit 120 calculates, for example, an error between a job execution time corresponding to the first power information 132 and a job execution time corresponding to the second power information 132 (hereinafter, also referred to as a time error).

Figure 23B:
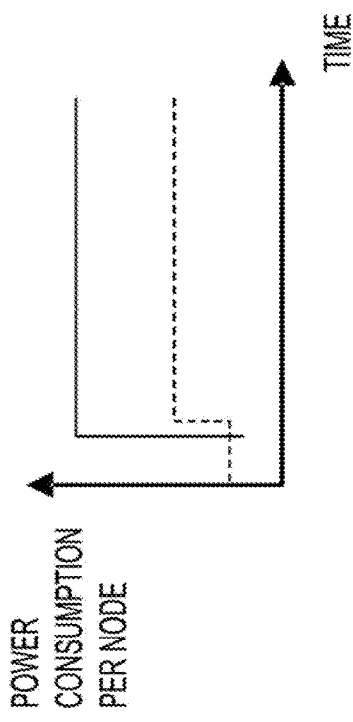
FIGS. 23A to 23D are diagrams for explaining a specific example of the process of S25.
Figure 23D:
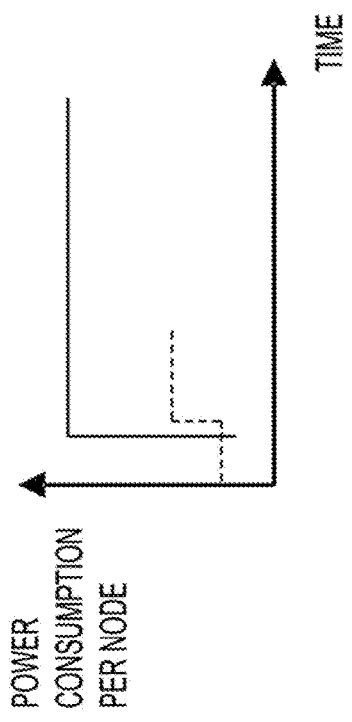
Figure 23A:
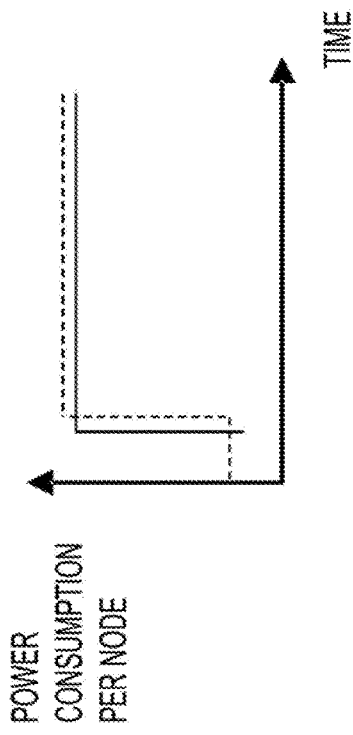
Figure 23C:
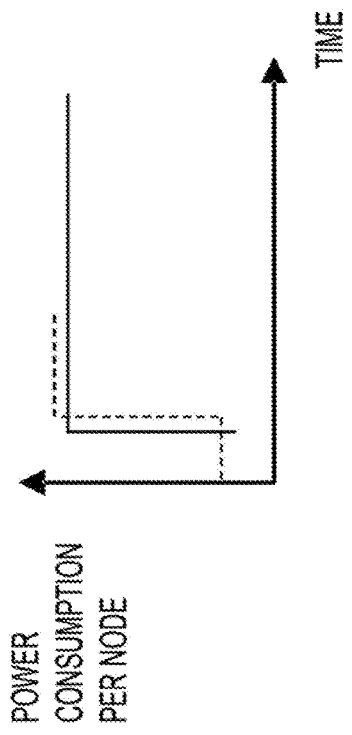

Then, for example, as illustrated in FIG. 23A, when there is a job in which each of the power error and the time error is equal to or less than a predetermined threshold value, the information generation unit 120 specifies "success" as similarity information of the job. Further, for example, as illustrated in FIG. 23B, when there is a job in which the time error is equal to or less than a threshold value and the power error exceeds the threshold value, the information generation unit 120 specifies "failure A" as similarity information of the job. Further, for example, as illustrated in FIG. 23C, when there is a job in which the power error is equal to or less than the threshold value and the time error exceeds the threshold value, the information generation unit 120 specifies "failure B" as similarity information of the job. In addition, for example, as illustrated in FIG. 23D, when there is a job in which each of the power error and the time error exceeds the threshold value, the information generation unit 120 specifies "failure C" s similarity information of the job.

Further, the information generation unit 120 may adopt, example, "5.8 (w)" as the threshold value of the power error and "10 (minutes)" as the threshold value of the time error.

Referring back to FIG. 6, the information generation unit 120 generates ratio information 134 indicating the ratio of jobs corresponding to each similarity information specified in the process of S25 for each content of the comparison information specified in the process of S23 (S26). Hereinafter, a specific example of the ratio information 134 will be described.

[Specific Example of Ratio Information]

FIG. 24 is a diagram illustrating a specific example of the ratio information 134.

The ratio information 134 illustrated in FIG. 24 includes an "item number" for identifying each information included in the ratio information 134, and the "job ID," the "user name," the "group name," the "application name," the "number of requested nodes," and the "maximum execution time" in which the same information as the similarity information described in FIG. 21C is stored, as items. Further, the ratio information 134 illustrated in FIG. 24 includes a "success" in which the ratio of jobs having similarity information as success is stored, a "failure A" in which the ratio of jobs having similarity information as failure A is stored, a "failure B" in which the ratio of jobs having similarity information as failure B is stored, and a "failure C" in which the ratio of jobs having similarity information as failure C is stored, as items.

Specifically, with respect to the ratio information 134 illustrated in FIG. 24, "TRUE" is stored as the "job ID," "TRUE" is stored as the "user name," "TRUE" is stored as the "group name," "TRUE" is stored as the "application name," "TRUE" is stored as the "number of requested nodes," and "TRUE" is stored as the "maximum execution time" in the information whose "item number" is "1." Further, with respect to the ratio information 134 illustrated in FIG. 24, "80(%)" is stored as the "success," "10(%)" is stored as the "failure A," "10(%)" is stored as the "failure B," and "0(%)" is stored as the "failure C" in the information whose "item number" is "1."

That is, the information in which the "item number" in the ratio information 134 illustrated in FIG. 24 is "1" indicates that the estimation of the power information 132 of the job in which all information included in the similarity information is "TRUE" is successful at a rate of 80(%), In addition, the information whose "item number" is "1" indicates that the failure corresponding to the failure A occurs at a rate of 10(%) and the failure corresponding to failure B occurs at a rate of 10(%) in the estimation of the power information 132 of the job whose all information included in the similarity information is "TRUE."

Further, with respect to the ratio information 134 illustrated in FIG. 24, "FALSE" is stored as the "job ID," "TRUE" is stored as the "user name," "TRUE" is stored as the "group name," "TRUE" is stored as the "application name," "TRUE" is stored as the "number of requested nodes," and "TRUE" is stored as the "maximum execution time" in the information whose "item number" is "2." Further, with respect to the ratio information 134 illustrated in FIG. 24, "60(%)" is stored as the "success," "15(%)" is stored as the "failure A," "10(%)" is stored as the "failure B," and "5(%)" is stored as the "failure C" in the information whose "item number" is "2."

That is, the information in which the "item number" in the ratio information 134 illustrated in FIG. 24 is "2" indicates that the estimation of the power information 132 of the job in which all information other than the "job ID" is "TRUE" is successful at a rate of 60(%). In addition, the information whose "item number" is "2" indicates that the failure corresponding to the failure A occurs at a rate of 15(%), the failure corresponding to the failure B occurs at a rate of 10(%), and the failure corresponding to failure C occurs at a rate of 5(%) in the estimation of the power information 132 of the job in which all information other than the "job ID" is "TRUE."

As a result, as described later, the information processing apparatus 1 may estimate the power information 132 of the job to be executed by referring to the ratio information 134. Descriptions of other information included in FIG. 24 are omitted.

[Details of Power Estimation Process]

Next, details of the power estimation process will be described. FIGS. 7 to 19 are flowcharts illustrating details of the power estimation process. Hereinafter, among the information included in the ratio information 134, the ratio corresponding to success will also be referred to as a first ratio, the ratio corresponding to the failure A will also be referred to as a second ratio, the ratio corresponding to the failure B will also be referred to as a third ratio, and the ratio corresponding to the failure C will also be referred to as a fourth ratio.

As illustrated in FIG. 7, the information receiving unit 111 of the information processing apparatus stands by until a new job has been received ("NO" in S31). Specifically, the information processing apparatus 1 stands by until a new job that needs to be scheduled for execution timing has been received.

In addition, when a new job has been received ("YES" in S31), the information specifying unit 112 of the information processing apparatus 1 specifies the first job information 131a related to the new job received in S31 (S32).

Subsequently, the candidate specifying unit 114 of the information processing apparatus 1 inputs the first job information 131a specified in the process of S32 to the topic model 133 generated in the process of S12, thereby specifying a predetermined number of pieces of third job information 131c having a high content matching ratio with the job information 131 specified in the process of S32 among the job information 131 stored in the information storage area 130 (S33). Specifically, the candidate specifying unit 114 specifies, for example, ten pieces of third job information 131c in the descending order of content matching ratio with the job information 131 specified in the process of S32.

Next, the status determination unit 115 of the information processing apparatus 1 refers to the ratio information 134 generated in the process of S26, and determines, for each third job information 131c specified in the process of S33, whether a first ratio corresponding to the comparison information with the first job information 131a specified in the process of S32 is equal to or greater than a predetermined ratio (S34).

Specifically, the status determination unit 115 determines, for example, for each third job information 131c specified in the process of S33, whether the first ratio corresponding to the comparison information with the first job information 131a specified in the process of S32 is 90% or more.

Then, the status determination unit 115 determines whether job information in which the first ratio corresponding to the comparison result with the first job information 131a specified in S32 is equal to or greater than a predetermined ratio exists in the third job information 131c specified in S33 (S35).

Figure 8:
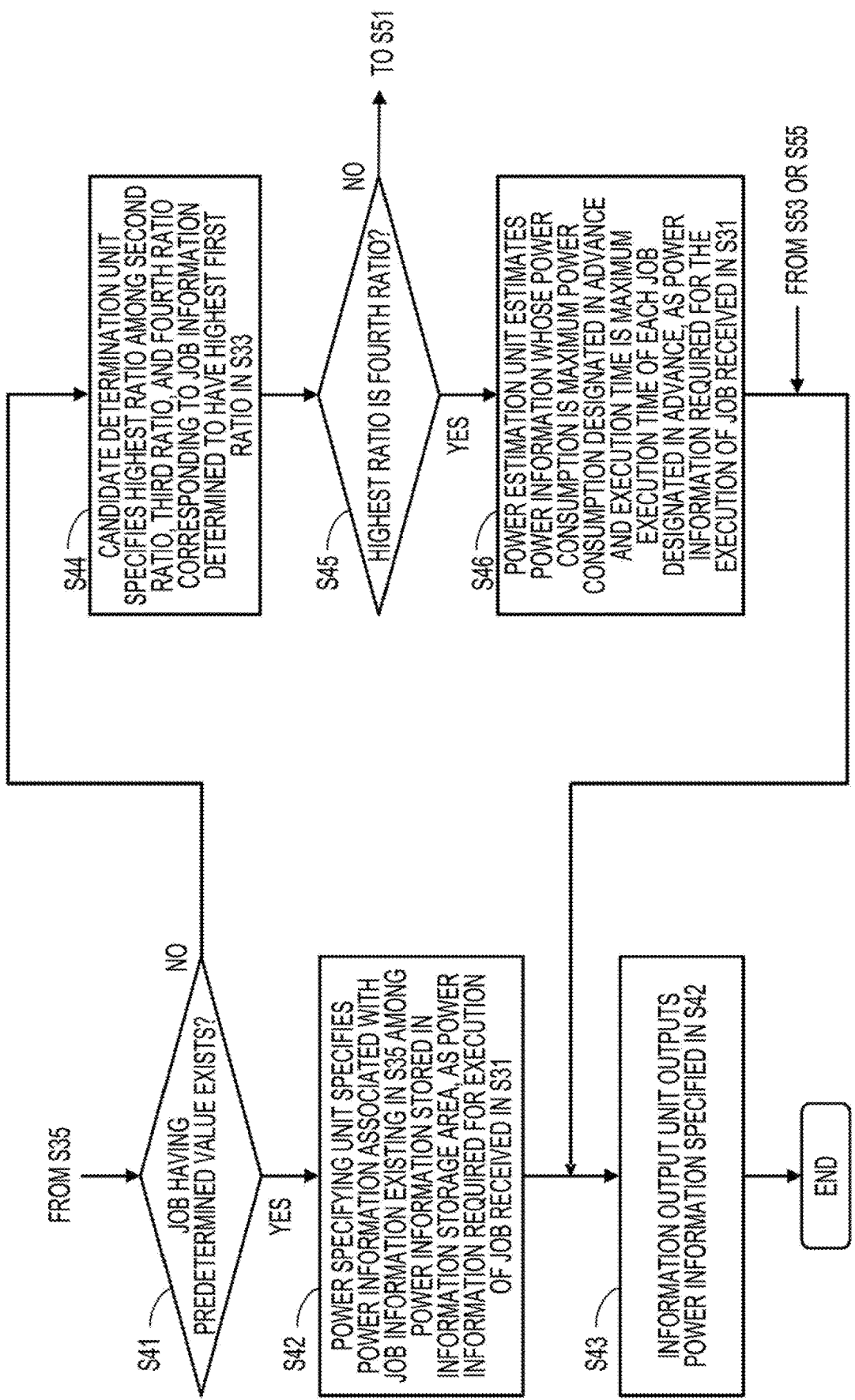
FIG. 8 is a flowchart for explaining details of the power estimation process according to the first embodiment.

As a result, as illustrated in FIG. 8, when it is determined that the third job information 131c having the first ratio equal to or greater than the predetermined ratio exists ("YES" in S41), the power specifying unit 117 of the information processing apparatus 1 specifies the power information 132 associated with the third job information 131c existing in the process of S35 among the power information 132 stored in the information storage area 130, as the power information 132 required for execution of the job received in the process of S31 (S42).

Further, the information output unit 122 of the information processing apparatus 1 outputs the power information 132 specified in the process of S42 (S43).

Specifically, in the ratio information 134 described with reference to FIG. 24, "90(%)" is stored in "success" of the information whose "item number" is "3." Therefore, for example, when the third job information 131c specified in the process of S33 includes job information 131 in which all information other than the "user name" is "TRUE," the power specifying unit 117 uses the power information 132 corresponding to the job information 131 in which all information other than the "user name" is "TRUE" among the third job information 131c specified in the process of S33, to the processing of S31, as an estimation result of the power information 132 required for executing the job received in the process of S31.

That is, when the third job information 131c corresponding to similarity information having a ratio stored as "success" equal to or greater than a predetermined ratio exists, even when the information processing apparatus 1 directly uses the power information 132 corresponding to the third job information 131c as the estimation result of the power information 132 required for the execution of the job received in the process of S31, it is possible to determine that no large error occurs with respect to the actual measurement result of the power information 132 of the job received in the process of S31.

Therefore, in this case, the information processing apparatus 1 does not correct the power information 132 specified in the process of S42.

Further, when it is determined that there are plural pieces of third job information 131c having the first ratio equal to or greater than the predetermined ratio, the power specifying unit 117 may specify the power information 132 associated with the third job information 131c having the highest first ratio among the third job information 131c determined to be present in plural pieces, as the power information 132 required for the execution of the job received in the process of S31. In addition, for example, when one piece of third job information 131c having the first ratio equal to or greater than a predetermined ratio is specified, the power specifying unit 117 may specify the power information 132 associated with the specified third job information 131c, as the power information 132 required for the execution of the job received in the process of S31, without checking whether there is another third job information 131c having the first ratio equal to or greater than the predetermined ratio.

Referring back to FIG. 8, when it is determined that the third job information 131c having the first ratio equal to or greater than the predetermined ratio does not exist ("NO" in S41), the candidate determination unit 116 of the information processing apparatus 1 specifies the highest ratio among the second ratio, third ratio, and fourth ratio, corresponding to the third job information 131c determined to have the highest first ratio in the process of S33 (S44).

As a result, when the highest ratio is the fourth ratio ("YES" in S45), the power estimation unit 118 of the information processing apparatus 1 estimates the power information 132 whose power consumption is a maximum power consumption designated in advance and execution time is a maximum execution time of each job designated in advance (maximum execution time included in the job information 131 of each job), as the power information 132 required for the execution of the job received in the process of S31 (S46).

Further, the information output unit 122 outputs the power information 132 estimated in the process of S46 (S43).

That is, when it is determined that the fourth ratio is the highest in the process of S44, the power estimation unit 118 may determine that it is difficult to accurately estimate the power information 132 required for executing the job received in the process of S31. Therefore, in this case, for example, the power estimation unit 118 estimates the power information 132 on an assumption that the execution time and power consumption of the job received in the process of S31 are the maximum.

Thus, the information processing apparatus 1 may prevent the actual power consumption associated with the execution of the job received in the process of S31 from significantly exceeding the estimation result. Therefore, the information processing apparatus 1 may prevent the amount of power consumption associated with the execution of the job from exceeding the amount of contracted power with the power company.

Figure 9:
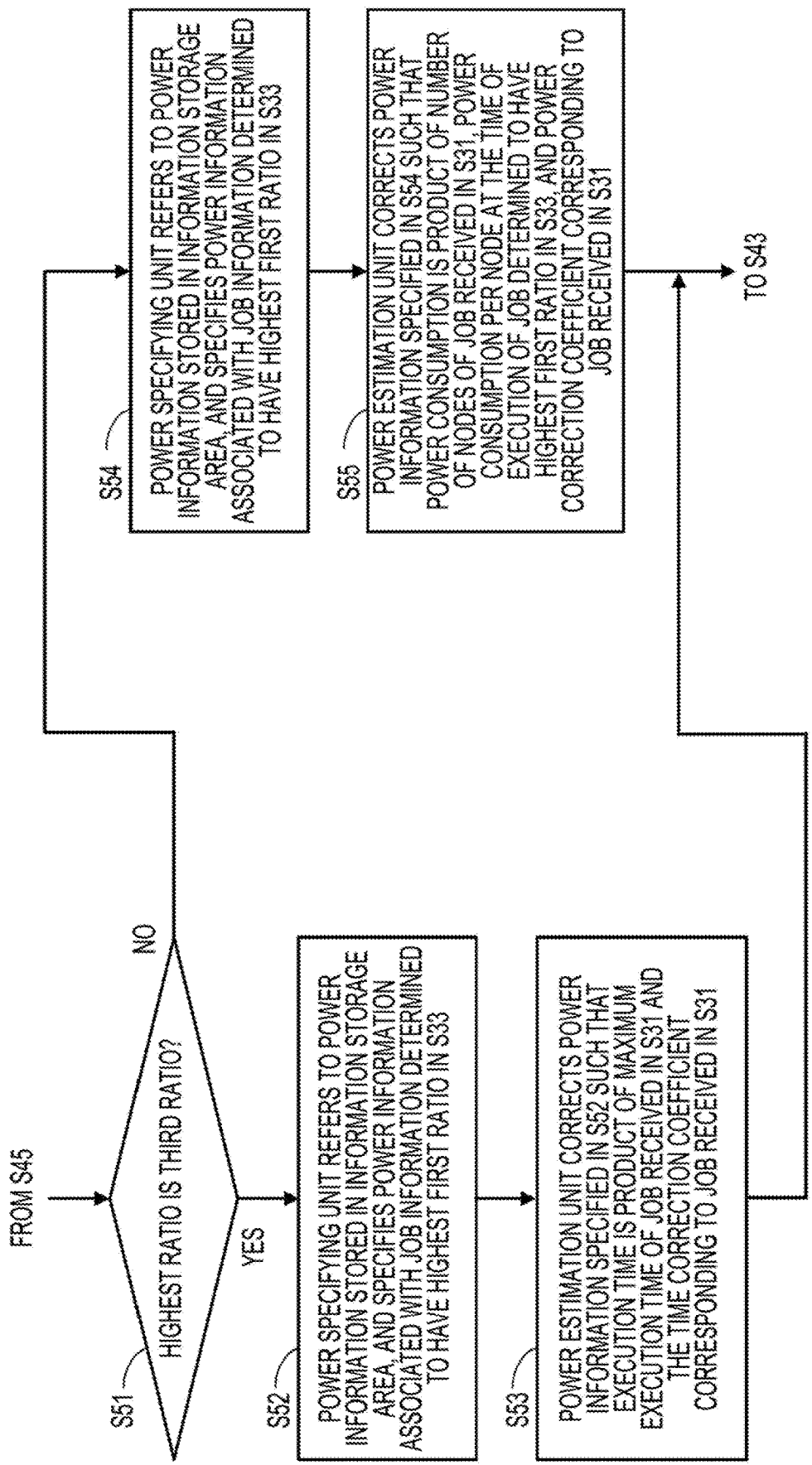
FIG. 9 is a flowchart for explaining details of the power estimation process according to the first embodiment.

Meanwhile, as illustrated in FIG. 9, when the highest ratio is the third ratio ("NO" in S45, "YES" in S51), the power specifying unit 117 refers to the power information 132 stored in the information storage area 130, and specifies the power information 132 associated with the third job information 131c determined to have the highest first ratio in the process of S33 (S52).

Then, the power estimation unit 118 corrects the power information 132 specified in the process of S52 such that the execution time is a product of the maximum execution time of the job received in the process of S31 and the time correction coefficient corresponding to the job received in the process of S31 (S53).

That is, in this case, the power estimation unit 118 corrects the job execution time included in the power information 132 specified in the process of S52.

Specifically, the power estimation unit 118 corrects the power information 132 specified in the process of S52, for example, such that the execution time is a product of the maximum execution time included in the first job information 131a specified in the process of S32 and the time correction coefficient calculated in the time coefficient calculation process (to be described later).

Thereafter, the information output unit 122 outputs the power information 132 corrected in the process of S53 (S43). Hereinafter, the details of the process of S53 will be described.

[Details of Process of S53]

Figure 10:
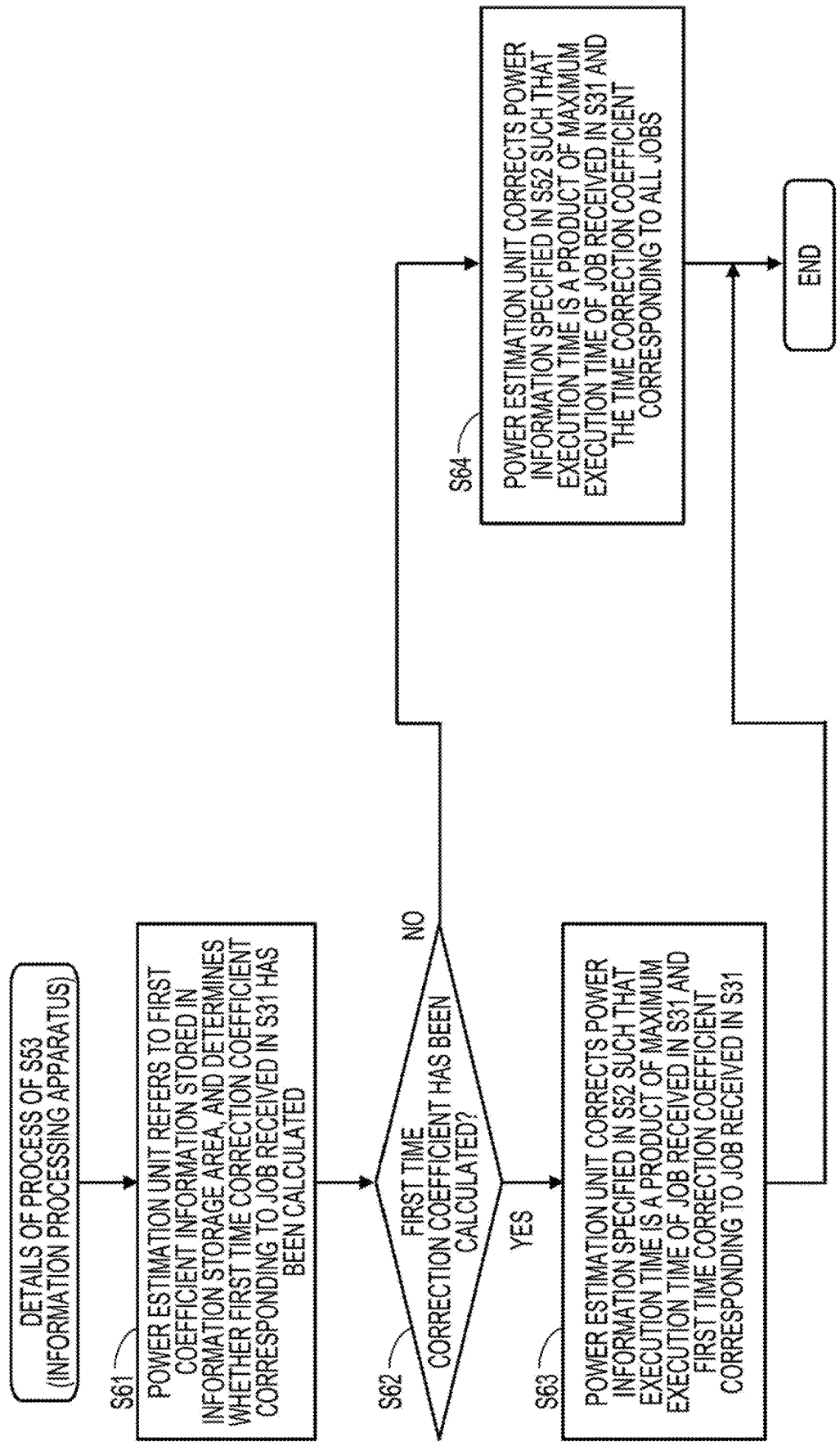
FIG. 10 is a flowchart for explaining details of the power estimation process according to the first embodiment.

FIG. 10 is a flowchart for explaining the details of the process of S53.

As illustrated in FIG. 10, the power estimation unit 118 refers to coefficient information about the execution time of each job (hereinafter, also referred to as first coefficient information 135a) among the coefficient information 135 stored in the information storage area 130, and determines whether a correction coefficient corresponding to the job received in the process of S31 (hereinafter, also referred to as a first time correction coefficient) has been calculated (S61).

Specifically, the power estimation unit 118 determines whether the first coefficient information 135a stored in the information storage area 130 includes the first time correction coefficient corresponding to the job received in the process of S31. Hereinafter, a specific example of the first coefficient information 135a will be described.

[Specific Example of First Coefficient Information]

FIG. 25 is a diagram illustrating a specific example of the first coefficient information 135a.

The first coefficient information 135a illustrated in FIG. 25 includes an "item number" for identifying each information included in the first coefficient information 135a, a "group name" in which a group name corresponding to each job is stored, a "user name" in which the user name corresponding to each job is stored, and an "application name" in which the application name corresponding to each job is stored as items. Also, the first coefficient information 135a illustrated in FIG. 25 includes a "correction coefficient" in which the first time correction coefficient of each job is stored as an item.

Specifically, "RD" is stored as the "group name," "tanaka" is stored as the "user name," "app12" is stored as the "application name," and "0.6" is stored as the "correction coefficient" in the information whose "item number" is "1."

That is, the information whose "item number" is 1 indicates that the correction coefficient of each job in which the "group name" is "RD," the "user name" is "tanaka," and the "application name" is "app12" is "0.6."

In addition, "test" is stored as the "group name," "0.9" is stored as the "correction coefficient," and "–" indicating that no information exists is stored as the "user name" and the "application name" in the information whose "item number" is "2."

That is, the information whose "item number" is "1" indicates that the correction coefficient of the job whose "group name" is "test" is "0.9."

Therefore, for example, when the group name of the job received in the process of S31 is "RD," the user name is "tanaka," and the application name is "app12," the power estimation unit 118 determines in the process of S61 that the first coefficient information 135a stored in the information storage area 130 includes the first time correction coefficient corresponding to the job received in the process of S31. Further, for example, when the group name of the job received in the process of S31 is "test," the user name thereof is "suzuki," and the application name thereof is "app03," the power estimation unit 118 determines that the first coefficient information 135a stored in the information storage area 130 includes the first time correction coefficient corresponding to the job received in the process of S31. Descriptions of other information included in FIG. 25 are omitted.

Referring back to FIG. 10, when the first time correction coefficient corresponding to the job received in the process of S31 has been calculated ("YES" in S62), the power estimation unit 118 corrects the power information 132 specified in the process of S52 such that the execution time is a product of the maximum execution time of the job received in the process of S31 and the first time correction coefficient corresponding to the job received in the process of S31 (S63). A process of calculating the first time correction coefficient will be described later.

Meanwhile, when the first time correction coefficient corresponding to the job received in the process of S31 has not been calculated ("NO" in S62), the power estimation unit 118 corrects the power information 132 specified in the process of S52 such that the execution time is a product of the maximum execution time of the job received in the process of S31 and the time correction coefficient corresponding to all jobs (hereinafter, also referred to as a second time correction coefficient) (S64).

That is, in this case, since the first time correction coefficient corresponding to the job received in the process of S31 has not been calculated, the power estimation unit 118 uses the second time correction coefficient that is a time correction coefficient corresponding to all jobs, instead of the first time correction coefficient. A process of calculating the second time correction coefficient will be described later.

Further, the power estimation unit 118 may determine, for example, whether the execution time included in the power information 132 corrected in the process of S63, etc. after the process of S63 or S64 (hereinafter, also referred to as the process of S63, etc.) is longer than the execution time included in the estimation information 136 corresponding to the job received in the process of S31.

In addition, for example, when it is determined that the execution time included in the power information 132 corrected in the process of S63, etc. is longer than the execution time included in the estimation information 136 corresponding to the job received in the process of S31, the power estimation unit 118 may correct the power information 132 corrected in the process of S63, etc. up to the execution time included in the estimation information 136 corresponding to the job received in the process of S31, thereby matching the execution time included in the power information 132 after the termination with the execution time included in the estimation information 136 corresponding to the job received in the process of S31.

Further, for example, when it is determined that the execution time included in the power information 132 corrected in the process of S63, etc. is shorter than the execution time included in the estimation information 136 corresponding to the job received in the process of S31, the power estimation unit 118 may perform a supplementation on the power information 132 corrected in the process of S63, etc. with an average value included in the estimation information 136 corresponding to the job received in the process of S31, thereby matching the execution time included in the supplemented power information 132 with the execution time included in the estimation information 136 corresponding to the job received in S31.

Referring back to FIG. 9, when the highest ratio is the second ratio ("NO" in S45, "NO" in S51), the power specifying unit 117 refers to the power information 132 stored in the information storage area 130, and specifies the power information 132 associated with the third job information 131c determined to have the highest first ratio in the process of S33 (S54).

Then, the power estimation unit 118 corrects the power information 132 specified in the process of S54 such that the power consumption is a product of the number of nodes at the time of execution of the job received in the process of S31, the power consumption per node at the time of execution of the job determined to have the highest first ratio in the process of S33, and the power correction coefficient corresponding to the job received in the process of S31 (S55).

That is, in this case, the power estimation unit 118 corrects the power consumption of the job included in the power information 132 specified in the process of S54.

Specifically, the power estimation unit 11 corrects the power information 132 specified in the process of S54, for example, such that the power consumption is a product of the number of requested nodes included in the first job information 131a specified in the process of S32, the average value of the power consumption of the job determined to have the highest first ratio in the process of S33, and the power correction coefficient calculated in the power coefficient calculation process (to be described later).

Thereafter, the information output unit 122 outputs the power information 132 corrected in the process of S55 (S43). Hereinafter, the details of the process of S55 will be described.

[Details of Process of S55]

Figure 11:
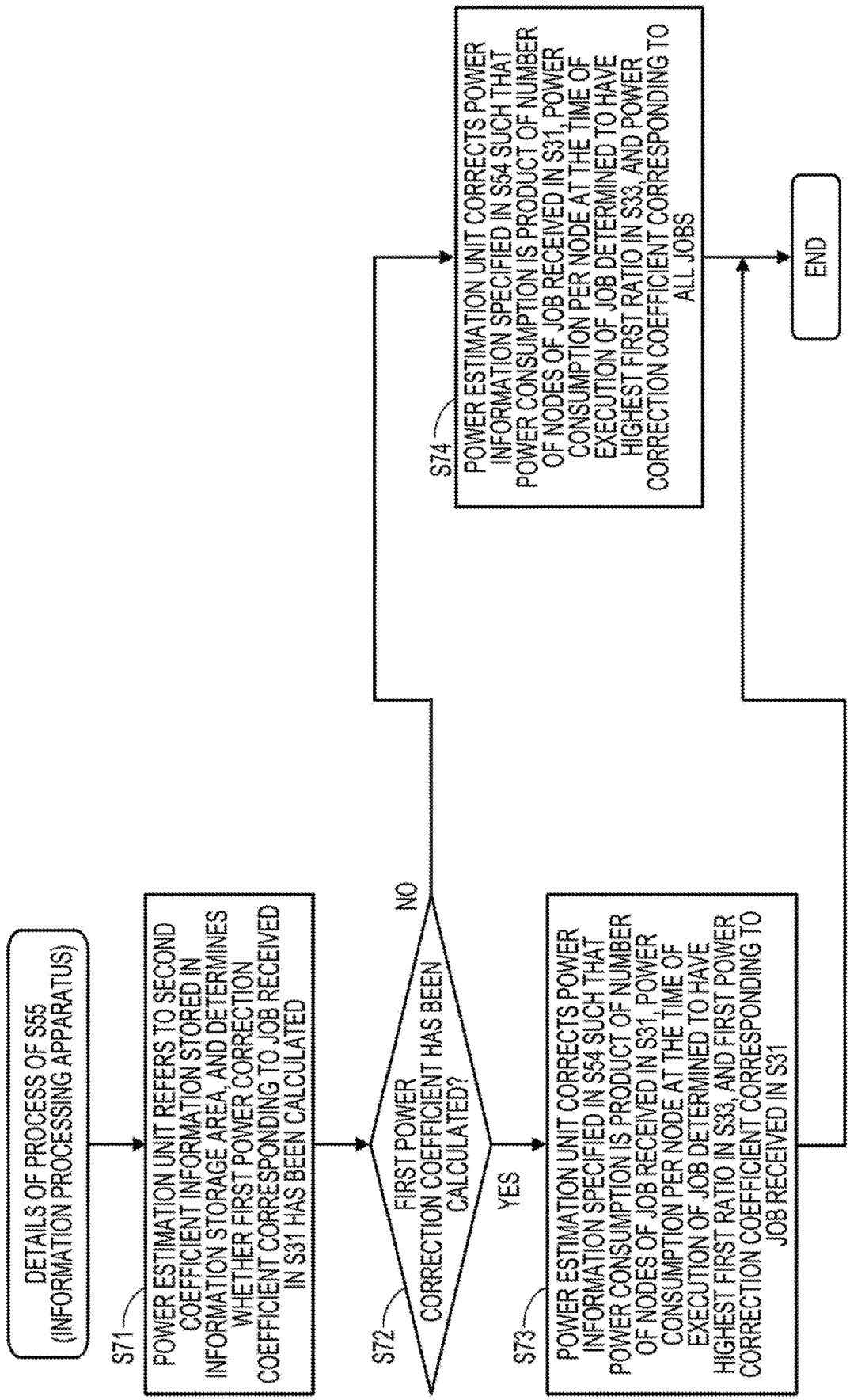
FIG. 11 is a flowchart for explaining details of the power estimation process according to the first embodiment.

FIG. 11 is a flowchart for explaining the details of the process of S55.

As illustrated in FIG. 11, the power estimation unit 118 refers to the coefficient information about power consumption at the time of execution of each job (hereinafter, also referred to as second coefficient information 135b) among the coefficient information 135 stored in the information storage area 130, and determines whether a correction coefficient corresponding to the job received in the process of S31 (hereinafter, also referred to as a first power correction coefficient) has been calculated (S71).

Specifically, the power estimation unit 118 determines whether the second coefficient information 135b stored in the information storage area 130 includes the first power correction coefficient corresponding to the job received in the process of S31. Hereinafter, a specific example of the second coefficient information 135b will be described.

[Specific Example of Second Coefficient Information]

FIG. 26 is a diagram illustrating a specific example of the second coefficient information 135b.

The second coefficient information 135b illustrated in FIG. 26 includes an "item number" for identifying each information included in the second coefficient information 135b, a "group name" in which the group name corresponding to each job is stored, a "user name" in which the user name corresponding to each job is stored, and an "application name" in which the application name corresponding to each job is stored, as items. Further, the second coefficient information 135b illustrated in FIG. 26 includes a "correction coefficient expression" in which an expression of the first power correction coefficient of each job is stored, and a "number of jobs" in which the number of jobs corresponding to each of information stored in the "group name," the "user name," and the "application name" is stored, as items.

Specifically, "RD" is stored as the "group name," "tanaka" is stored as the "user name," "app12" is stored as the "application name," "expression 1-3" is stored as the "correction coefficient expression," and "10" is stored as the "number of jobs" in the information whose "item number" is "1."

That is, the information whose "item number" is "1" indicates that the correction coefficient expression for a job whose "group name" is "RD," "user name" is "tanaka," and "application name" is "app12" is "expression 1-3."

In addition, "test" is stored, as the "group name," "suzuki" is stored as the "user name," "–" is stored as the "application name," "expression 4-3" is stored as the "correction coefficient expression," and "5" is stored as the "number of jobs" in the information whose "item number" is "2."

That is, the information whose "item number" is "2" indicates that the correction coefficient expression of a job whose "group name" is "test" and "user name" is "suzuki" is "expression 4-3."

Therefore, for example, when the group name of the job received in the process of S31 is "RD," the user name is "tanaka," and the application name is "app12," the power estimation unit 118 determines in the process of S71 that the second power information 135b stored in the information storage area 130 includes the first power correction coefficient corresponding to the job received in the process of S31. Further, for example, when the group name of the job received in the process of S31 is "test," the user name is "suzuki," and the application name is "app03," the power estimation unit 118 determines that the second power information 135b stored in the information storage area 130 includes the first power correction coefficient corresponding to the job received in the process of S31. Descriptions of other information included in FIG. 26 are omitted.

Referring back to FIG. 11, when the first power correction coefficient corresponding to the job received in the process of S31 has been calculated ("YES" in S72), the power estimation unit 118 corrects the power information 132 specified in the process of S54 such that the power consumption is a product of the number of nodes at the time of execution of the job received in the process of S31, the power consumption per node at the time of execution of the job determined to have the highest first ratio in the process of S33, and the first power correction coefficient corresponding to the job received in the process of S31 (S73). A process of calculating the first power correction coefficient will be described later.

Meanwhile, when the first power correction coefficient corresponding to the job received in the process of S31 has not been calculated ("NO" in S72), the power estimation unit 118 corrects the power information 132 specified in the process of S54 such that the power consumption is a product of the number of nodes at the time of execution of the job received in the process of S31, the power consumption per node at the time of execution of the job determined to have the highest first ratio in the process of S33, and the power correction coefficient corresponding to all jobs (hereinafter, also referred to as a second power correction coefficient) (S74).

That is, in this case, since the first power correction coefficient corresponding to the job received in the process of S31 has not been calculated, the power estimation unit 118 uses the second power correction coefficient that is a power correction coefficient corresponding to all jobs, instead of the first power correction coefficient. A process of calculating the second power correction coefficient will be described later.

In addition, for example, the information processing apparatus 1 may perform the processes of S54 and S55 even after the process of S42, the process of S46, or the process of S51.

As a result, the information processing apparatus 1 may accurately estimate the power information 132 when a new job is executed.

[Time Coefficient Calculation Process]

Next, a process of calculating a time correction coefficient (hereinafter, also referred to as a time coefficient calculation process) will be described.

As illustrated in FIG. 12, the coefficient calculation unit 121 of the information processing apparatus 1 stands by until the calculation timing of the time correction coefficient is reached ("NO" in S81). The calculation timing of the time correction coefficient may be, for example, a timing when the person in charge inputs information indicating that the time correction coefficient has been calculated to the information processing apparatus 1. Further, the calculation timing of the time correction coefficient may be, for example, a periodic timing.

In addition, when the calculation timing of the time correction coefficient is reached ("YES" in S81), the coefficient calculation unit 121 determines whether a job has been received in the process of S31 after the previous time coefficient calculation process is executed (S82).

As a result, when it is determined that the job has been received in the process of S31 ("YES" in S83), the coefficient calculation unit 121 specifies one of the jobs determined to have been received in the process of S31 (S84).

Then, the coefficient calculation unit 121 determines whether the first time correction coefficient of a calculation unit including the job specified in the process of S84 exists in the first coefficient information 135a stored in the information storage area 130 (S85). The calculation unit used herein is a unit determined in a time coefficient unit determination process (to be described later), and is a unit indicating a range of jobs using the same time correction coefficient.

Specifically, in the first coefficient information 135a described in FIG. 25, for example, "0.6" is stored as the "correction coefficient" of a job in which the "group name" is "RD," the "user name" is "tanaka," and the "application name" is "app12." Therefore, when the "group name" of the new job received in the process of S31 is "RD," the "user name" thereof is "tanaka," and the "application name" thereof is "app12," the coefficient calculation unit 121 determines in the process of S85 that the first time correction coefficient of the calculation unit including the job specified in the process of S84 exists in the first coefficient information 135a stored in the information storage area 130.

Figure 13:
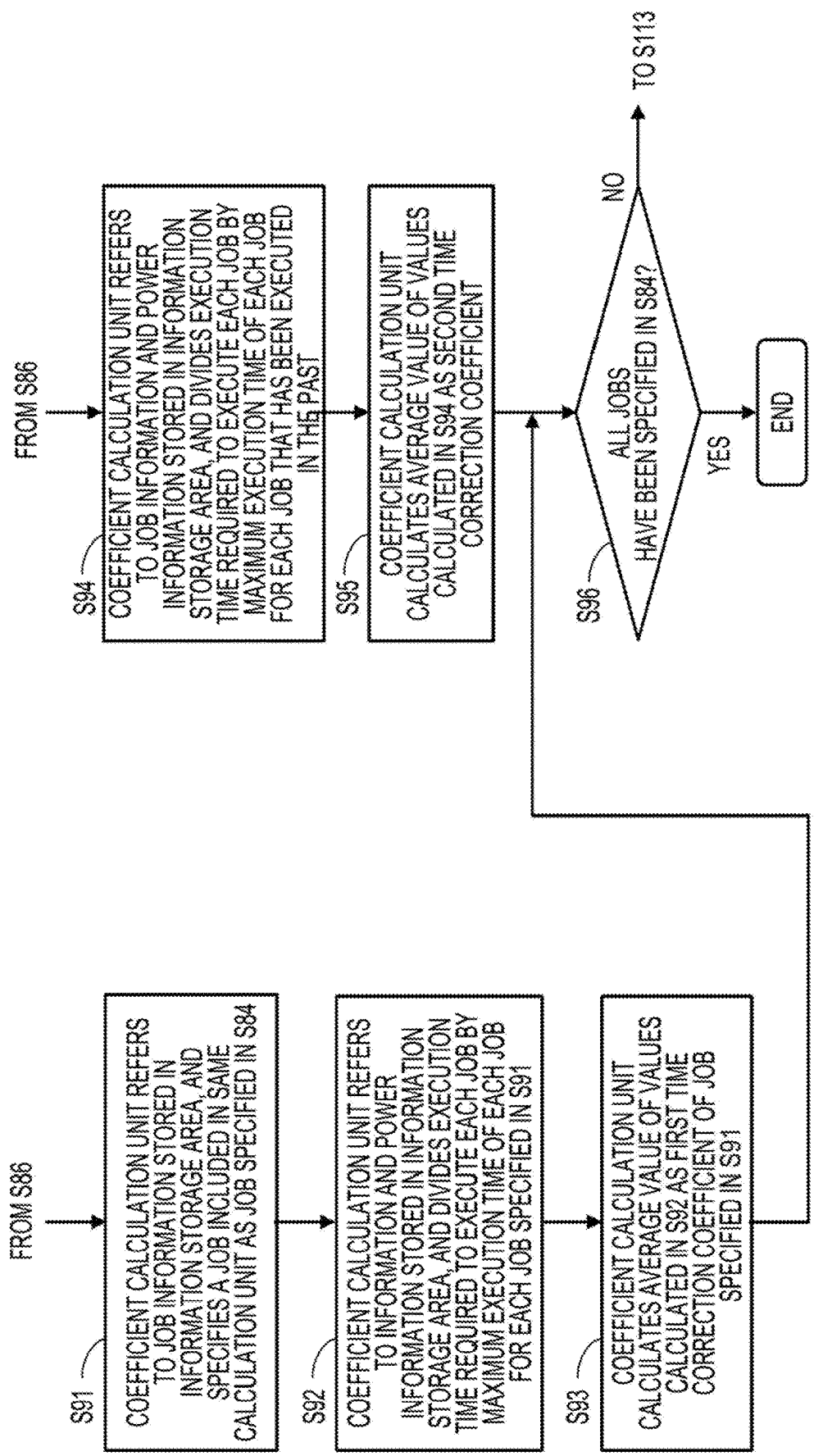
FIG. 13 is a flowchart for explaining details of the power estimation process according to the first embodiment.

Then, when it is determined that there is a first time correction coefficient in the calculation unit including the job specified in S84 ("YES" in S86), as illustrated in FIG. 13, the coefficient calculation unit 121 refers to the job information 131 stored in the information storage area 130, and specifies a job included in the same calculation unit as the job specified in the process of S84 (S91).

Specifically, in the first coefficient information 135a described in FIG. 25, for example, "test" is stored in the "group name," and information in which "–" is stored in the "user name" and the "application name" (information whose "item number" is "2") is included. That is, the first coefficient information 135a described with reference to FIG. 25 indicates that the calculation unit of a job in which "test" is stored in the "group name" is used for each group name. Therefore, for example, when the "group name" of the new job received in the process of S31 is "test," the coefficient calculation unit 121 specifies information in which the "group name" is "test" among the job information 131 stored in the information storage area 130.

Subsequently, the coefficient calculation unit 121 refers to the job information 131 and the power information 132 stored in the information storage area 130, and divides the execution time required to execute each job by the maximum execution time of each job for each job specified in the process of S91 (S92).

Specifically, the coefficient calculation unit 121 divides the execution time included in the power information 132 corresponding to each job (actual execution time) by the maximum execution time included in the job information 131 corresponding to each job for each job specified in the process of S91.

Thereafter, the coefficient calculation unit 121 calculates an average value of the values calculated in the process of S92 as the first time correction coefficient of the job specified in the process of S91 (the job having the same calculation unit as the job specified in S84) (S93).

Then, when it is determined that all jobs determined to have been received in the process of S82 have not been specified in the process of S84 ("NO" in S96), the coefficient calculation unit 121 performs the processes subsequent to S84 again.

Meanwhile, when it is determined that all jobs determined to have been received in the process of S82 have been specified in the process of S84 ("YES" in S96), the coefficient calculation unit 121 ends the time coefficient calculation process.

Further, when it is determined that the first time correction coefficient of the calculation unit including the job specified in the process of S84 does not exist ("NO" in S86), the coefficient calculation unit 121 refers to the job information 131 and the power information 132 stored in the information storage area 130, and divides the execution time required for executing each job by the maximum execution time of each job, for each job that has been executed in the past (S94).

Specifically, the coefficient calculation unit 121 divides the execution time included in the power information 132 of each job by the maximum execution time included in the job information 131 of each job, for each job whose power information 132 is stored in the information storage area 130.

Thereafter, the coefficient calculation unit 121 calculates an average value of the values calculated in the process of S94 as the second time correction coefficient (S95).

That is, a case where the first time correction coefficient of the calculation unit including the job specified in S84 does not exist refers to a case where it is determined that there is no need to calculate the first time correction coefficient for the job specified in the process of S84 in the time coefficient unit determination process (to be described later). Therefore, in this case, the coefficient calculation unit 121 updates the second time correction coefficient corresponding to all jobs without calculating the first time correction coefficient for the job specified in the process of S84.

Then, when it is determined that all jobs determined to have been received in the process of S82 have not been specified in the process of S84 ("NO" in S96), the coefficient calculation unit 121 performs the processes subsequent to S84 again.

Meanwhile, when it is determined that all jobs determined to have been received in the process of S82 have been specified in the process of S84 ("YES" in S96), the coefficient calculation unit 121 ends the time coefficient calculation process. Further, the coefficient calculation unit 121 ends the time coefficient calculation process similarly when it is determined that the job is not received in the process of S31 ("NO" in S83).

[Power Coefficient Calculation Process]

Next, a process of calculating a power correction coefficient (hereinafter, also referred to as a power coefficient calculation process) will be described.

As illustrated in FIG. 14, the coefficient calculation unit 121 stands by until the calculation timing of the power correction coefficient is reached ("NO" in S101). The calculation timing of the power correction coefficient may be, for example, a timing when the person in charge inputs information indicating that the power correction coefficient is calculated to the information processing apparatus 1. Further, the calculation timing of the power correction coefficient may be, for example, a periodic timing.

Then, when the calculation timing of the power correction coefficient is reached ("YES" in S101), the coefficient calculation unit 121 determines whether a job has been received in the process of S31 after the previous time coefficient calculation process is executed (S102).

As a result, when it is determined that a job has been received in the process of S31 ("YES" in S103), the coefficient calculation unit 121 specifies one of the jobs determined to have been received in the process of S31 (S104).

Then, the coefficient calculation unit 121 determines whether the first power correction coefficient of the calculation unit including the job specified in the process of S104 exists in the second coefficient information 135b stored in the information storage area 130 (S105).

Specifically, in the second coefficient information 135b described with reference to FIG. 26, for example, "expression 1-3" is stored as the "correction coefficient" of a job in which the "group name" is "RD," the "user name" is "tanaka," and the "application name" is "app12." Therefore, when the "group name" of the new job received in the process of S31 is "RD," the "user name" thereof is "tanaka," and the "application name" thereof is "app12," the coefficient calculation unit 121 determines in the process of S105 that information corresponding to the first power correction coefficient of the calculation unit including the job specified in the process of S104 exists in the second coefficient information 135b stored in the information storage area 130.

Figure 15:
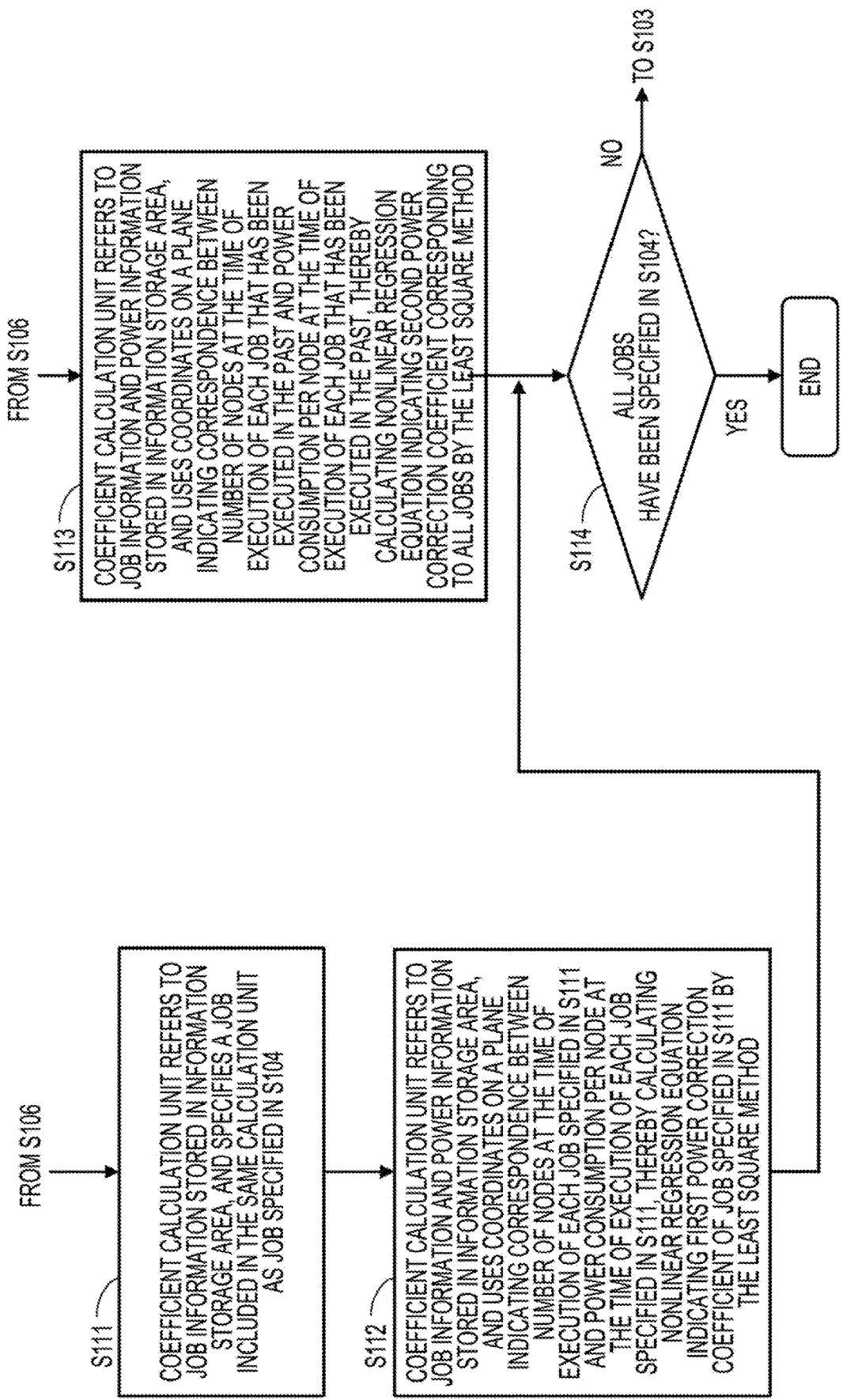
FIG. 15 is a flowchart for explaining details of the power estimation process according to the first embodiment.

Then, when it is determined that there is a first power correction coefficient in the calculation unit including the job specified in the process of S104 ("YES" in S106), as illustrated in FIG. 15, the coefficient calculation unit 121 refers to the job information 131 stored in the information storage area 130, and specifies a job included in the same calculation unit as the job specified in the process of S104 (S111).

Specifically, in the second coefficient information 135b described in FIG. 26, for example, "test" is stored in the "group name," "suzuki" is stored in the "user name," and information in which "−" is stored in the "application name" (information whose "item number" is "2") is included. That is, the second coefficient information 135b described in FIG. 26 indicates that the calculation unit of the job in which "test" is stored in the "group name" and "suzuki" is stored in the "user name" is used for each group name and for each user name. Therefore, for example, when the "group name" of the new job received in the process of S31 is "test" and the "user name" is "suzuki," the coefficient calculation unit 121 specifies information having "test" as the "group name" and "suzuki" as the "user name" among the job information 13 stored in the information storage area 130.

Subsequently, the coefficient calculation unit 121 refers to the job information 131 and the power information 132 stored in the information storage area 130, and uses coordinates on a plane indicating a correspondence between the number of nodes at the time of execution of each job specified in S111 and the power consumption per node at the time of execution of each job specified in S111, thereby calculating a nonlinear regression equation indicating the first power correction coefficient of the job specified in the process of S111 (the job having the same calculation unit as the job specified in S104) by the least square method (S112).

Specifically, the coefficient calculation unit 121 sets, for example, the following formula (1) as a prediction function indicating power consumption per node. In the following expression (1), "a" and "θ" are regression coefficients, and "X" is a variable indicating the number of nodes.

$$a/(1+\theta *X) \tag{1}$$

Then, the coefficient calculation unit 121 calculates a and θ that minimize D, which is a sum of the distances from each coordinate, in the following expression (2) of the least square method.

$$D = \sum_{i=1}^{n} \varepsilon_i^2 = \sum_{i=1}^{2} \{y_i - a/(1+\theta *X)\}^2 \tag{2}$$

Thereafter, the coefficient calculation unit 121 calculates a nonlinear regression equation indicating the first power correction coefficient of the job specified in the process of S111 by applying the calculated a and to the expression (1).

Referring back to FIG. 15, when it is determined that all jobs determined to have been received in S102 have not been specified in S104 ("NO" in S114), the coefficient calculation unit 121 performs the processes subsequent to S104 again.

Meanwhile, when it is determined that all jobs determined to have been received in S102 have been specified in S104 ("YES" in S114), the coefficient calculation unit 121 ends the time coefficient calculation process.

Further, when it is determined that there is no first time correction coefficient in the calculation unit including the job specified in the process of S104 ("NO" in S106), the coefficient calculation unit 121 refers to the job information 131 and the power information 132 stored in the information storage area 130, and uses coordinates on a plane indicating a correspondence between the number of nodes at the time of execution of each job that has been executed in the past and the power consumption per node at the time of execution of each job that has been executed in the past, thereby calculating a nonlinear regression equation indicating the second power correction coefficient corresponding to all jobs by the least square method (S113).

Then, when it is determined that all jobs determined to have been received in S102 have not been specified in S104 ("NO" in S114), the coefficient calculation unit 121 performs the processes subsequent to S104 again.

Meanwhile, when it is determined that all jobs determined to have been received in S102 have been specified in S104 ("YES" in S114), the coefficient calculation unit 121 ends the time coefficient calculation process. Further, the coefficient calculation unit 121 ends the time coefficient calculation process similarly when it is determined that the job has not been received in the process of S31 ("NO" in S103).

[Time Coefficient Unit Determination Process]

Next, a process of determining a job calculation unit for calculating a time correction coefficient (hereinafter, also referred to as a time coefficient unit determination process) will be described.

Figure 16:
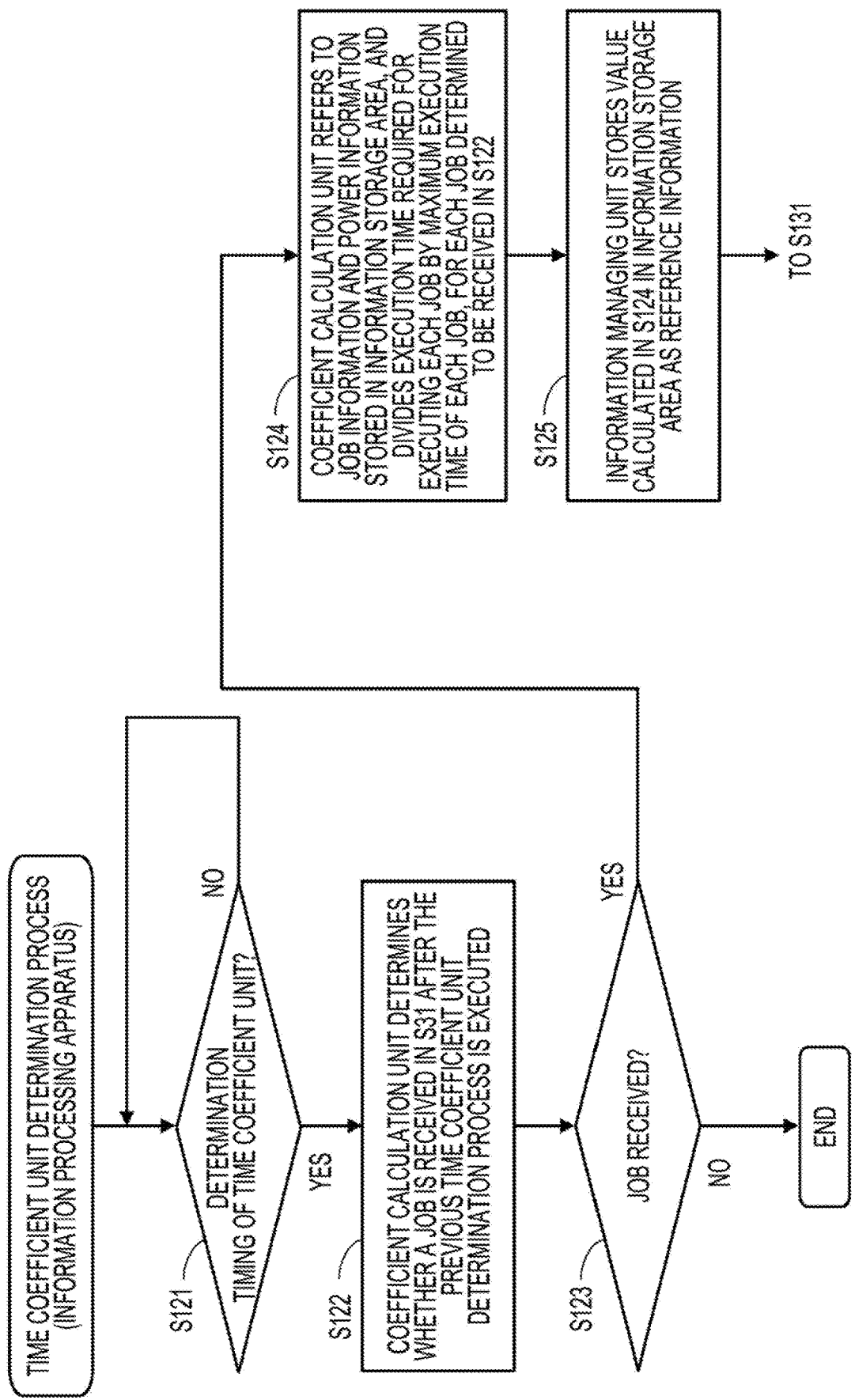
FIG. 16 is a flowchart for explaining details of the power estimation process according to the first embodiment.

As illustrated in FIG. 16, the coefficient calculation unit 121 stands by until the determination timing of the time coefficient unit is reached ("NO" in S121). The determination timing of the time coefficient unit may be, for example, a timing when the person in charge inputs information indicating that the time correction coefficient is calculated to the information processing apparatus 1. Further, the determination timing of the time coefficient unit may be, for example, a periodic timing.

Then, when the determination timing of the time coefficient unit is reached ("YES" in S121), the coefficient calculation unit 121 determines whether a job has been received in the process of S31 after the previous time coefficient unit determination process is executed (S122).

As a result, when it is determined that the job has been received in the process of S31 ("YES" in S123), the coefficient calculation unit 121 refers to the job information 131 and the power information 132 stored in the information storage area 130, and divides the execution time required for actual execution of each job by the maximum execution time of each job, for each job determined to have been received in the process of S122 (S124).

Then, the information managing unit 113 stores the value calculated by the process of S123 in the information storage area 130 as reference information (not illustrated) (S125).

Figure 17:
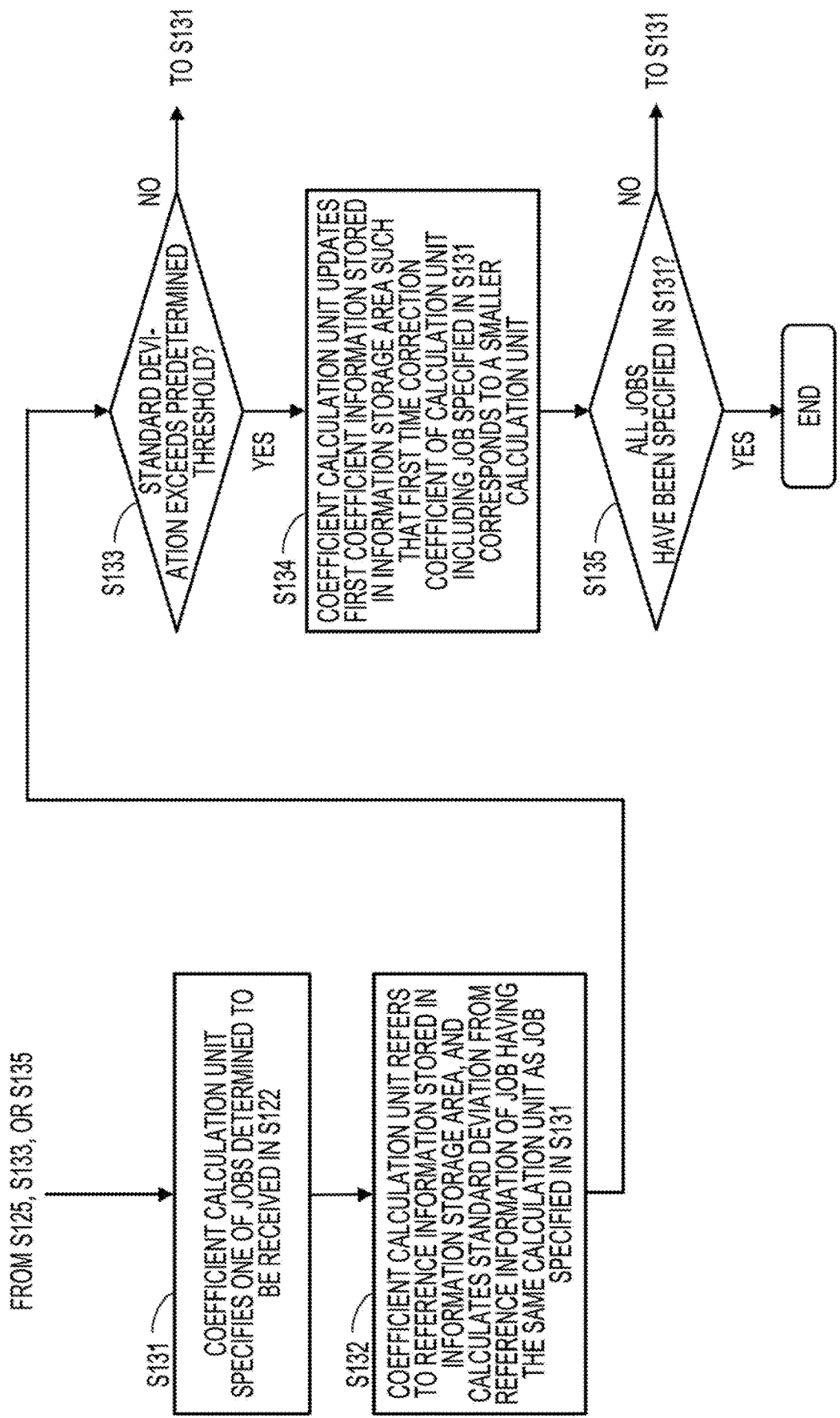
FIG. 17 is a flowchart for explaining details of the power estimation process according to the first embodiment.

Subsequently, as illustrated in FIG. 17, the coefficient calculation unit 121 specifies one of the jobs determined to have been received in the process of S122 (S131).

Next, the coefficient calculation unit 121 refers to the reference information stored in the information storage area 130, and calculates a standard deviation from the reference information of the job having the same calculation unit as the job specified in the process of S131 (S132).

As a result, when the standard deviation calculated in the process of S132 exceeds a predetermined threshold value ("YES" in S133), the coefficient calculation unit 121 updates the first coefficient information 135a stored in the information storage area 130 such that the first time correction coefficient of the calculation unit including the job specified in the process of S131 corresponds to a smaller calculation unit (S134).

That is, when the variation of the reference information calculated in the process of S123 becomes larger, the coefficient calculation unit 121 makes the calculation unit of the first time correction coefficient corresponding to the reference information calculated in the process of S123 smaller.

Specifically, for example, when the calculation unit including the job specified in the process of S131 is used for each group name, the coefficient calculation unit 121 updates the first coefficient information 135a such that the calculation unit including the job specified in the process of S131 is used for each group name and for each user name. Further, for example, when the calculation unit including the job specified in the process of S131 is used for each group name and for each user name, the coefficient calculation unit 121 updates the first coefficient information 135a such that the calculation unit including the job specified in the process of S131 is used for each group name, for each user name, and for each application name.

In addition, the predetermined threshold value used in the process of S133 may be, for example, 0.2. Hereinafter, a specific example of the process of S134 will be described.

[Specific Example of Process of S134]

FIG. 27 is a diagram illustrating a specific example of the first coefficient information 135a. Specifically, FIG. 27 is a diagram illustrating the first coefficient information 135a updated from the state described in FIG. 25.

For example, when the "group name" and "user name" included in the job information 131 of the job specified in the process of S131 are "test" and "suzuki," respectively, and when the standard deviation exceeds a predetermined threshold value, as illustrated in FIG. 27, the coefficient calculation unit 121 stores "suzuki" in the "user name" of information whose "group name" is "test" (information whose "item number" is "2") among the information included in the first coefficient information 135a described with reference to FIG. 25. Further, in this case, the coefficient calculation unit 121 stores "–" in the "correction coefficient" of the information whose "item number" is "2."

Thereafter, the coefficient calculation unit 121 calculates a value stored in the "correction coefficient" of the information whose "item number" is "2" in the next time coefficient calculation process.

Thus, the coefficient calculation unit 121 may suppress the number of times of calculating the time correction coefficient.

Referring back to FIG. 17, when not all the jobs have been specified in the process of S131 ("NO" in S135), the coefficient calculation unit 121 performs the processes after S131 again. In addition, similarly, when the standard deviation calculated in the process of S132 is equal to or smaller than a predetermined threshold value ("NO" in S133), the coefficient calculation unit 121 performs the processes after S131 again.

Meanwhile, when all the jobs have been specified in the process of S131 ("YES" in S135), the coefficient calculation unit 121 ends the time coefficient unit determination process.

Further, the coefficient calculation unit 121 also ends the time coefficient unit determination process in the same manner when it is determined that the job has not been received in the process of S31 ("NO" in S123).

[Power Coefficient Unit Determination Process]

Next, a process of determining a job calculation unit for calculating a power correction coefficient (hereinafter, also referred to as a power coefficient unit determination process) will be described.

As illustrated in FIG. 18, the coefficient calculation unit 121 stands by until the determination timing of the power coefficient unit is reached ("NO" in S141). The determination timing of the power coefficient unit may be, for example, a timing when the person in charge inputs information indicating that the power correction coefficient is calculated to the information processing apparatus 1. Further, the determination timing of the power coefficient unit may be, for example, a periodic timing.

When the determination timing of the power coefficient unit is reached ("YES" in S141), the coefficient calculation unit 121 determines whether a job has been received in the process of S31 after the previous power coefficient unit determination process is executed (S142).

As a result, when it is determined that the job has been received in the process of S31 ("YES" in S143), the coefficient calculation unit 121 specifies one of the jobs determined to have been received in the process of S142 (S144).

Next, the coefficient calculation unit 121 refers to the power information 132 and the estimation information 136 stored in the information storage area 130, and calculates an error between the power consumption included in the estimation information 136 for the job specified in S144 and the actual power consumption included in the power information 132 for the job specified in S144 (S145).

Figure 19:
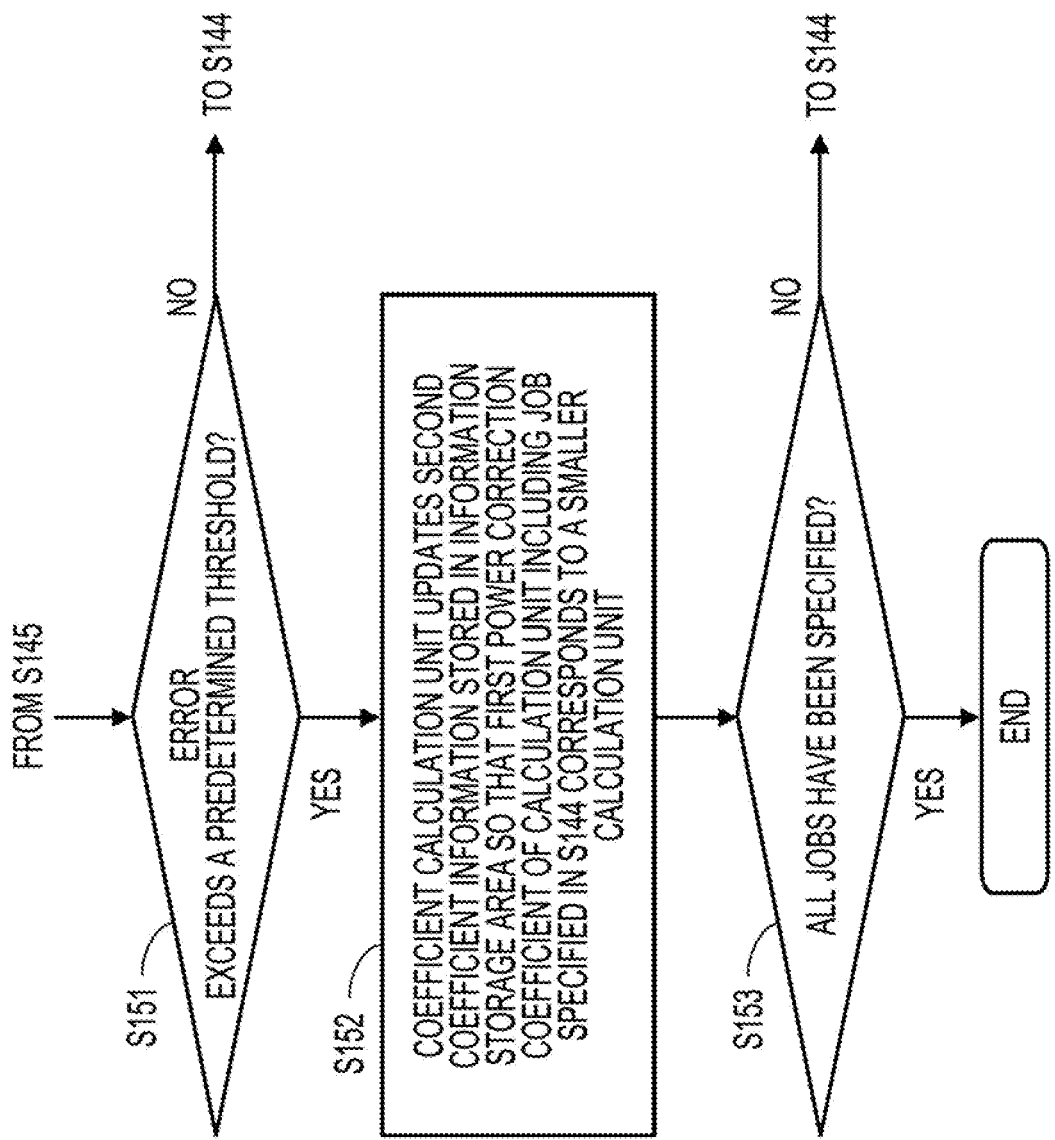
FIG. 19 is a flowchart for explaining details of the power estimation process according to the first embodiment.

As a result, as illustrated in FIG. 19, when the error calculated in the process of S145 exceeds a predetermined threshold value ("YES" in S151), the coefficient calculation unit 121 updates the second coefficient information 135b stored in the information storage area 130 so that the first power correction coefficient of the calculation unit including the job specified in the process of S144 corresponds to a smaller calculation unit (S152).

That is, when the error calculated in the process of S145 increases, the coefficient calculation unit 121 makes the calculation unit of the first power correction coefficient corresponding to the error calculated in the process of S145 smaller.

Specifically, for example, when the calculation unit including the job specified in the process of S144 is used for each group name, the coefficient calculation unit 121 updates the second coefficient information 135b so that the calculation unit including the job specified in the process of S144 is used for each group name and for each user name. In addition, for example, when the calculation unit including the job specified in the process of S144 is used for each group name and for each user name, the coefficient calculation unit 121 updates the second coefficient information 135b so that the calculation unit including the job specified in the process of S144 is used for each group name, for each user name, and for each application name.

Further, the coefficient calculation unit 121 may calculate a root mean squared error (RMSE), for example, in the process of S145. Then, the coefficient calculation unit 121 may update the second coefficient information 135b when the calculated RMSE exceeds 10(%) for example, in the process of S151. Hereinafter, a specific example of the process of S152 will be described.

[Specific Example of Process of S152]

FIG. 28 is a diagram illustrating a specific example of the second coefficient information 135b. Specifically, FIG. 28 is a diagram illustrating the second coefficient information 135b updated from the state described in FIG. 26.

For example, when the "group name," the "user name," and the "application name" included in the job information 131 of the job specified in the process of S144 are "test," "suzuki," and "app03," respectively, and when the error exceeds the predetermined threshold value, the coefficient calculation unit 121 stores "app03" in the "application name" of the information whose "item number" is "2" among the information included in the second coefficient information 135b described with reference to FIG. 26, as illustrated in FIG. 28. Further, in this case, the coefficient calculation unit 121 stores "–" in the "correction coefficient expression" of the information whose "item number" is "2." Also, in this case, the coefficient calculation unit 121 stores, in the "number of jobs," "2" which is the number of the job whose "group name" is "test," "user name" is "suzuki," and "application name" is "app03."

Thereafter, the coefficient calculation unit 121 calculates an expression stored in the "correction coefficient expression" of the information whose "item number" is "2" in the power coefficient calculation process to be performed next.

Thus, the coefficient calculation unit 121 may suppress the number of times of calculating the power correction coefficient.

Referring back to FIG. 19, when all jobs have not been specified in the process of S144 ("NO" in S153), the coefficient calculation unit 121 performs the processes after S144 again. Similarly, when the error calculated in the process of S132 is equal to or smaller than a predetermined threshold value ("NO" in S151), the coefficient calculation unit 121 performs the processes after S144 again.

Meanwhile, when all jobs have been specified in the process of S144 ("YES" in S153), the coefficient calculation unit 121 ends the power coefficient unit determination process. The coefficient calculation unit 121 also ends the power coefficient unit determination process similarly when it is determined that the job has not been received in the process of S31 ("NO" in S143).

As described above, the information processing apparatus 1 according to the present embodiment specifies, for example, the first job information 131a related to a new job that needs to be scheduled for execution timing. Then, the information processing apparatus 1 refers to the information storage area 130 that stores the second job information 131b related to each job executed in the past and the power information 132 required for executing each job in association with each other, and specifies a predetermined number of pieces of the third job information 131c of which the matching status with the first job information 131a satisfies the first condition among the second job information 131b. Further, the information processing apparatus 1 determines whether the matching status with the first job information 131a satisfies the second condition for each specified third job information 131c, and specifies any job information 131 of the third job information 131c based on the determination result.

Thereafter, the information processing apparatus 1 refers to the information storage area 130 and specifies the power information 132 associated with the specified job information 131. Then, the information processing apparatus 1 estimates the power information 132 obtained by correcting the specified power information 132 according to the determination result as the power information 132 at the time of execution of a new job.

That is, the information processing apparatus 1 specifies a predetermined number of pieces of third job information 131c similar to the first job information 131a corresponding to a new job to be executed among, for example, the second job information 131b corresponding to each job executed in the past. Then, for example, the information processing apparatus 1 specifies the power information 132 of the job corresponding to the similar job information 131 of the first job information 131a among the specified third job information 131c. Further, the information processing apparatus 1 specifies, for example, the power information 132 obtained by correcting the specified power information 132 according to a similar state between the first job information 131a and the similar job information 131, as the power information 132 of the new job.

As a result, the information processing apparatus 1 may accurately estimate the power information 132 when a new job is executed. For this reason, the information processing apparatus 1 may suppress an increase in power charge associated with the execution of each job.

According to an aspect of the embodiments, it is possible to accurately estimate power information when a job is executed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
    specifying, upon receiving a new job, first job information related to the new job;
    referring to a storage that stores second job information and power information in association with each other for each of past jobs executed in past to specify a predetermined number of pieces of third job information of which matching status with the first job information satisfies a first condition, the second job information being related to each of the past jobs, the power information indicating power consumption at a time of executing each of the past jobs;
    determining, for each piece of the third job information, whether a matching status with the first job information satisfies a second condition;
    specifying one piece of the third job information based on a determination result as to whether the matching status satisfies the second condition;
    referring to the storage to specify power information associated with the one piece of the third job information;
    correcting the specified power information in accordance with the determination result; and
    estimating power information indicating power consumption at a time of executing the new job based on the corrected power information.

2. The non-transitory computer-readable recording medium according to claim 1, the process further comprising:
    specifying, for each piece of the second job information, a ratio of information that matches a content of the first job information; and
    specifying, as the predetermined number of pieces of the third job information, the predetermined number of pieces of the second job information having a ratio higher than a predetermined ratio.

3. The non-transitory computer-readable recording medium according to claim 2, the process further comprising:
    specifying, as the predetermined number of pieces of the third job information, the predetermined number of pieces of job information output in response to an input of the first job information from a topic model obtained by learning plural pieces of the second job information.

4. The non-transitory computer-readable recording medium according to claim 1, the process further comprising:
    specifying from plural pieces of the second job information, for each of the past jobs, fourth job information having a highest ratio of information that matches a content of the second job information related to each of the past jobs, the fourth job information being different from the second job information related to the each of the past jobs;
    specifying, for each of the past jobs, comparison information indicating whether information of each item included in the second job information related to each of the past jobs matches information of each item included in the fourth job information corresponding to each of the past jobs;
    referring to the storage, for each of the past jobs, to specify first power information corresponding to the second job information related to each of the past jobs and second power information corresponding to the fourth job information corresponding to each of the past jobs;
    specifying, for each of the past jobs, similarity information indicating a similar state between the first power information and the second power information;
    specifying, for each piece of the comparison information, a first ratio of first similarity information, a second ratio of second similarity information, a third ratio of third similarity information, and a fourth ratio of fourth similarity information among the specified similarity information, the first similarity information indicating that the first power information and the second power information are similar, the second similarity information indicating that the first power information and a second power information are not similar with respect to power consumption at a time of executing a job, the third similarity information indicating that the first power information and the second power information are not similar with respect to an execution time of a job, the fourth similarity information indicating that the first power information and the second power information are not similar with respect to the execution time of a job and the power consumption at a time of executing a job; and
    determining, for each piece of the third job information, whether the matching status with the first job information satisfies the second condition based on the first ratio, second ratio, third ratio, and fourth ratio.

5. The non-transitory computer-readable recording medium according to claim 4, the process further comprising:
- determining, for each piece of the third job information whether the second condition is satisfied depending on whether the first ratio corresponding to the comparison information with the first job information is equal to or greater than a predetermined value;
- specifying, as the one piece of the third job information, a piece of the third information having the first ratio that is equal to or greater than the predetermined value if any; and
- estimating the power information indicating power consumption at the time of executing the new job based on the specified power information.

6. The non-transitory computer-readable recording medium according to claim 4, the process further comprising:
- determining, for each piece of the third job information, whether the second condition is satisfied depending on whether the first ratio corresponding to the comparison information with the first job information is equal to or greater than a predetermined value; and
- specifying as the one piece of the third job information, when none of the third job information has the first ratio that is equal to or greater than the predetermined value, a piece of the third job information having a highest ratio of information that matches a content of the first job information.

7. The non-transitory computer-readable recording medium according to claim 6, the process further comprising:
- specifying, when none of the third job information has the fiat ratio that is equal to or greater than the predetermined value, a highest ratio among the second ratio, the third ratio, and the fourth ratio corresponding to the one piece of the third job information; and
- estimating, when the specified highest ratio is the fourth ratio, the power information indicating power consumption at the time of executing the new job based on power information including a maximum power consumption designated in advance and a maximum execution time of a job designated in advance.

8. The non-transitory computer-readable recording medium according to claim 6, the process further comprising:
- specifying, when none of the third job information has the first ratio that is equal to or greater than the predetermined value, a highest ratio among the second ratio, the third ratio, and the fourth ratio corresponding to the one piece of the third job information; and
- correcting, when the specified highest ratio is the third ratio, the power information such that an execution time in the specified power information is a product of a maximum execution time of a job designated in advance and a predetermined correction coefficient to estimate the power information indicating power consumption at the time of executing the new job.

9. The non-transitory computer-readable recording medium according to claim 8, the process further comprising:
- calculating as the predetermined correction coefficient, for each of calculation units each constituted by one or more jobs among the past jobs, an average value of values calculated by dividing an execution time of each job by the maximum execution time corresponding to each job.

10. The non-transitory computer-readable recording medium according to claim 9, the process further comprising:
- calculating, for each of the calculation units, a standard deviation from the calculated values; and
- calculating again, when there is a calculation unit in which the standard deviation exceeds a predetermined threshold value, the predetermined correction coefficient for each of smaller calculation units obtained by dividing the calculation unit.

11. The non-transitory computer-readable recording medium according to claim 6, the process further comprising:
- specifying, when none of the third job information has the first ratio that is equal to or greater than the predetermined value, a highest ratio among the second ratio, the third ratio, and the fourth ratio corresponding to the one piece of the third job information; and
- correcting, when the specified highest ratio is the second ratio, the power information such that power consumption in the specified power information is a product of a number of nodes when the new job is executed, power consumption per node at a time of executing a job corresponding to the one piece of the third job information, and a predetermined correction coefficient to estimate the power information indicating power consumption at the time of executing the new job.

12. The non-transitory computer-readable recording medium according to claim 11, wherein
the predetermined correction coefficient becomes smaller as the number of nodes increases.

13. The non-transitory computer-readable recording medium according to claim 11, the process further comprising:
- calculating a nonlinear regression equation indicating the predetermined correction coefficient by a least square method by using coordinates on a plane, the coordinates indicating a correspondence between the number of nodes at the time of executing each job and the power consumption per node at the time of executing each job for each calculation unit constituted by one or more past jobs.

14. The non-transitory computer-readable recording medium according to claim 13, the process further comprising:
- calculating, for each of the past jobs, an error between the power consumption in the estimated power information of each job and power consumption at a time of executing each job; and
- calculating again, when there is a job in which the calculated error exceeds a predetermined threshold value, the predetermined correction coefficient for each of smaller calculation units obtained by dividing a calculation unit including the job in which the calculated error exceeds the predetermined threshold value.

15. An information processing apparatus, comprising:
a memory; and
a processor coupled to the memory and the processor configured to:
specify, upon receiving a new job, first job information related to the new job;
refer to a storage that stores second job information and power information in association with each other for each of past jobs executed in past to specify a predetermined number of pieces of third job information of which matching status with the first job information satisfies a first condition, the second job information being related to each of the past jobs, the power information indicating power consumption at a time of executing each of the past jobs;

determine for each piece of the third job information, whether a matching status with the first job information satisfies a second condition;

specify one piece of the third job information based on a determination result as to whether the matching status satisfies the second condition;

refer to the storage to specify power information associated with the one piece of the third job information;

correcting the specified power information in accordance with the determination result; and estimate power information indicating power consumption at a time of executing the new job based on the corrected power information.

16. The information processing apparatus according to claim 15, wherein
the processor is further configured to:
specify, for each piece of the second job information, a ratio of information that matches a content of the first job information; and
specify, as the predetermined number of pieces of the third job information, the predetermined number of pieces of the second job information having a ratio higher than a predetermined ratio.

17. The information processing apparatus according to claim 16, wherein
the processor is further configured to:
specify, as the predetermined number of pieces of the third job information, the predetermined number of pieces of job information output in response to an input of the first job information from a topic model obtained by learning plural pieces of the second job information.

18. A power estimation method, comprising:
specifying by a computer, upon receiving a new job, first job information related to the new job;
referring to a storage that stores second job information and power information in association with each other for each of past jobs executed in past to specify a predetermined number of pieces of third job information of which matching status, with the first job information satisfies a first condition, the second job information being related to each of the past jobs, the power information indicating power consumption at a time of executing each of the past jobs;

determining, for each piece of the third job information, whether a matching status with the first job information satisfies a second condition;

specifying one piece of the third job information based on a determination result as, to whether the matching status satisfies the second condition;

referring to the storage to specify power information associated with the one piece of the third job information;

correcting the specified power information in accordance with the determination result; and estimating power information indicating power consumption a time of executing the new job based on the corrected power information.

19. The power estimation method according to claim 1 further comprising:
specifying, for each piece of the second job information, a ratio of information that matches a content of the first job information; and
specifying, as the predetermined number of pieces of the third job information, the predetermined number of pieces of the second job information having a ratio higher than a predetermined ratio.

20. The power estimation method according to claim 19, further comprising:
specifying, as the predetermined number of pieces of the third job information, the predetermined number of pieces of job information output in response to an input of the first job information from a topic model obtained by learning plural pieces of the second job information.

* * * * *